US011468389B2

(12) United States Patent
van Heusden et al.

(10) Patent No.: US 11,468,389 B2
(45) Date of Patent: Oct. 11, 2022

(54) SYSTEMS AND METHODS FOR ANALYTICS, PREDICTIONS, AND REPORTING

(71) Applicant: ServiceNow, Inc., Santa Clara, CA (US)

(72) Inventors: David van Heusden, Utrecht (NL); Silvia Mihit, Almere (NL); Dushyant Saabharwal, Amsterdam (NL); Vijaykrushna Ponnada, Telangana (IN)

(73) Assignee: ServiceNow, Inc., Santa Clara, CA (US)

( * ) Notice: Subject to any disclaimer, the term of this patent is extended or adjusted under 35 U.S.C. 154(b) by 1061 days.

(21) Appl. No.: 15/792,584

(22) Filed: Oct. 24, 2017

(65) Prior Publication Data
US 2018/0322433 A1 Nov. 8, 2018

(51) Int. Cl.
| G06Q 10/06 | (2012.01) |
| H04L 29/08 | (2006.01) |
| G06F 3/048 | (2013.01) |
| G06Q 10/04 | (2012.01) |
| H04L 67/10 | (2022.01) |

(52) U.S. Cl.
CPC ....... *G06Q 10/06393* (2013.01); *G06F 3/048* (2013.01); *G06Q 10/04* (2013.01); *H04L 67/10* (2013.01)

(58) Field of Classification Search
None
See application file for complete search history.

(56) References Cited

U.S. PATENT DOCUMENTS

| 6,321,229 B1 | 11/2001 | Goldman |
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,646,093 B2 | 2/2014 | Myers |
| 8,689,241 B2 | 4/2014 | Naik |
| 8,743,121 B2 | 6/2014 | De Peuter |

(Continued)

*Primary Examiner* — Eric W Stamber
*Assistant Examiner* — Ashley Y Young
(74) *Attorney, Agent, or Firm* — Fletcher Yoder PC

(57) ABSTRACT

Systems and methods for generating and rendering interactive analysis are provided. The interactive analysis includes an incident map and heat map that are dynamically changeable based upon selectable incident attributes, filters, or both.

20 Claims, 32 Drawing Sheets

(56) References Cited

U.S. PATENT DOCUMENTS

| | | | |
|---|---|---|---|
| 8,887,133 B2 | 11/2014 | Behnia | |
| 9,065,783 B2 | 6/2015 | Ding | |
| 9,122,552 B2 | 9/2015 | Whitney | |
| 9,239,857 B2 | 1/2016 | Trinon | |
| 9,535,737 B2 | 1/2017 | Joy | |
| 9,792,387 B2 | 10/2017 | George | |
| 9,819,729 B2 | 11/2017 | Moon | |
| 2017/0212668 A1* | 7/2017 | Shah | G06T 11/206 |

* cited by examiner

FIG. 47

SYSTEMS AND METHODS FOR ANALYTICS, PREDICTIONS, AND REPORTING

CROSS-REFERENCE TO RELATED APPLICATION

This application claims priority to and the benefit of Indian Patent Application No. 201711015995, entitled "SYSTEMS AND METHODS FOR ANALYTICS, PREDICTIONS, AND REPORTING", filed May 5, 2017, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As systems for collecting data become more readily available and the costs for storage hardware continue to decrease, the amount of data that these computer resources are capable of collecting is increasing. For instance, in addition to collecting raw data more frequently, metadata associated with the time in which the raw data has been generated or acquired may also be stored for a given data set.

Although the capabilities of computer resources for collecting and storing data continue to expand, the vast amount of collected data has resulted in difficulties with analysis and reporting of the ever-increasing multitude of data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized analysis of such data, enabling predictive forecasting. Further, the current embodiments enable interactivity with this data. The embodiments further provide complex reporting capabilities for the time-series data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 47 is an illustration of a GUI that provides data imported from an external source via the report designer, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following discussion relates to analysis, forecasting, and reporting systems for Information Technology (IT) systems. However, this is not meant to limit the current techniques to IT systems. Indeed, the current techniques may be useful in a number of different contexts. For example the current techniques may be applied to Human Resources (HR) systems or any system that may benefit from the analysis, forecasting, and reporting of data.

Keeping this in mind, the discussion now turns to an Information Technology (IT)-centered example. IT devices are increasingly important in an electronics-driven world in which various electronics devices are interconnected within a distributed context. As more functions are performed by services using some form of distributed computing, the complexity of IT network management increases. As management complexities increase, data analysis, forecasting, and reporting may become more complex.

Figure 1:
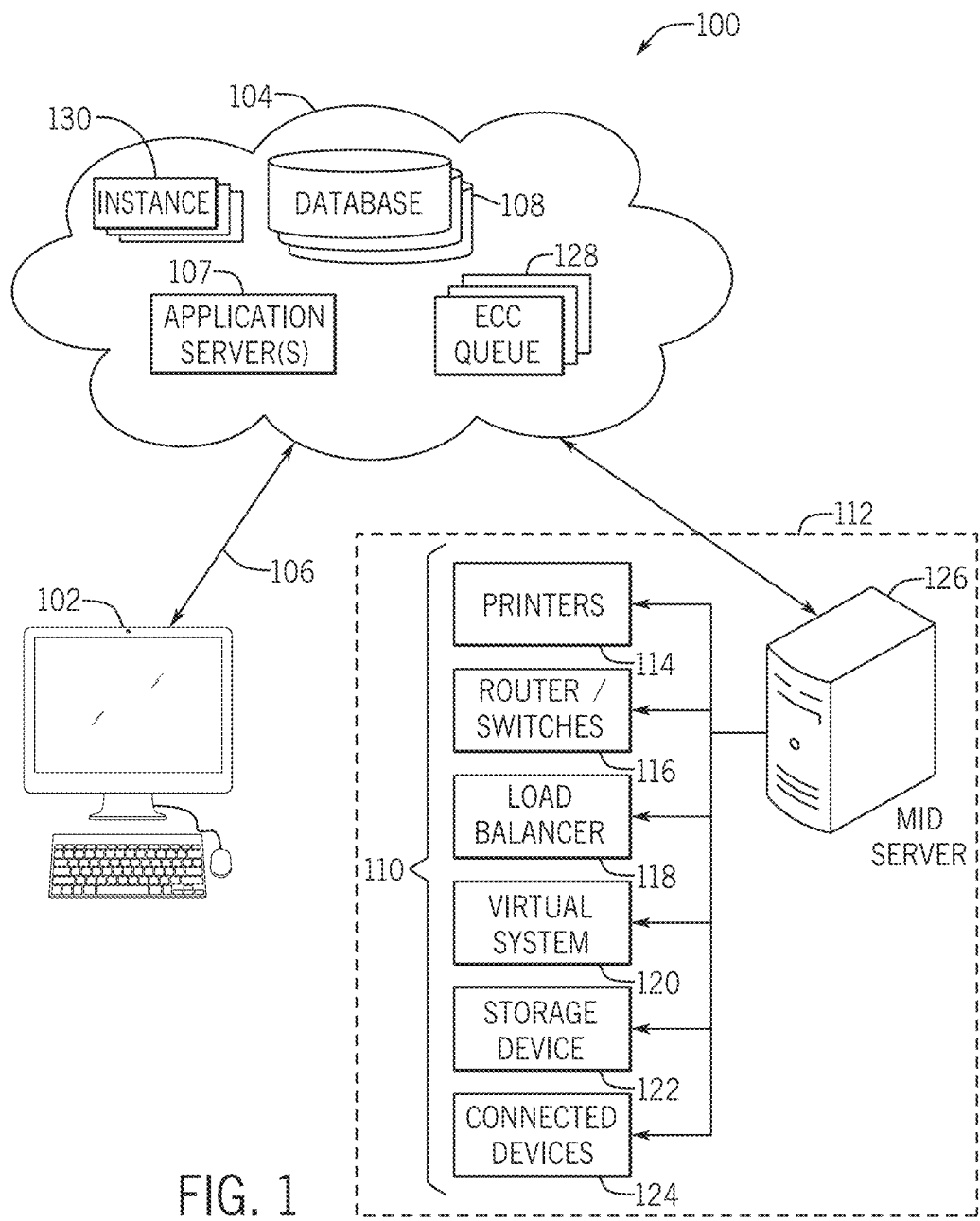
FIG. 1 is a block diagram of a generalized distributed computing system utilizing a cloud service type platform and databases, in accordance with an embodiment.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, here a cloud service type platform, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related to various IT assets that may be present within the network 112. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and/or a time series database. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via an External Communications Channel Queue 128. The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104. As discussed below, the MID server 126 may periodically or intermittently use discovery probes to determine information on devices connected to the network 112 and return the probe results back to the platform 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication channel 128 may be a database table that is typically queried, updated, and inserted into by other systems. Each record in the communication channel queue 128 is a message from an instance in the platform 104 to a system (e.g., MID server 126) external to the platform 104 that connects to the platform 104 or a specific instance 130 running in the platform 104 or a message to the instance from the external system. The fields of an communication channel queue 128 record include various data about the external system or the message in the record.

Although the system 100 is described as having the application servers 107, the databases 108, the communication channel queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, other methods for populating the databases 108 may include directly importing the CIs or other entries from an external source, manual import by users entering CIs o or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Figure 2:
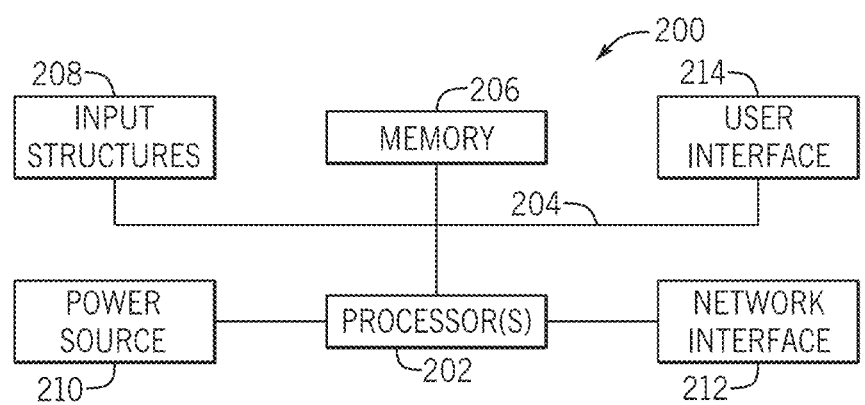
FIG. 2 is a block diagram of a computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other suitable circuitry for performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Homepages and Dashboards

Figure 3:
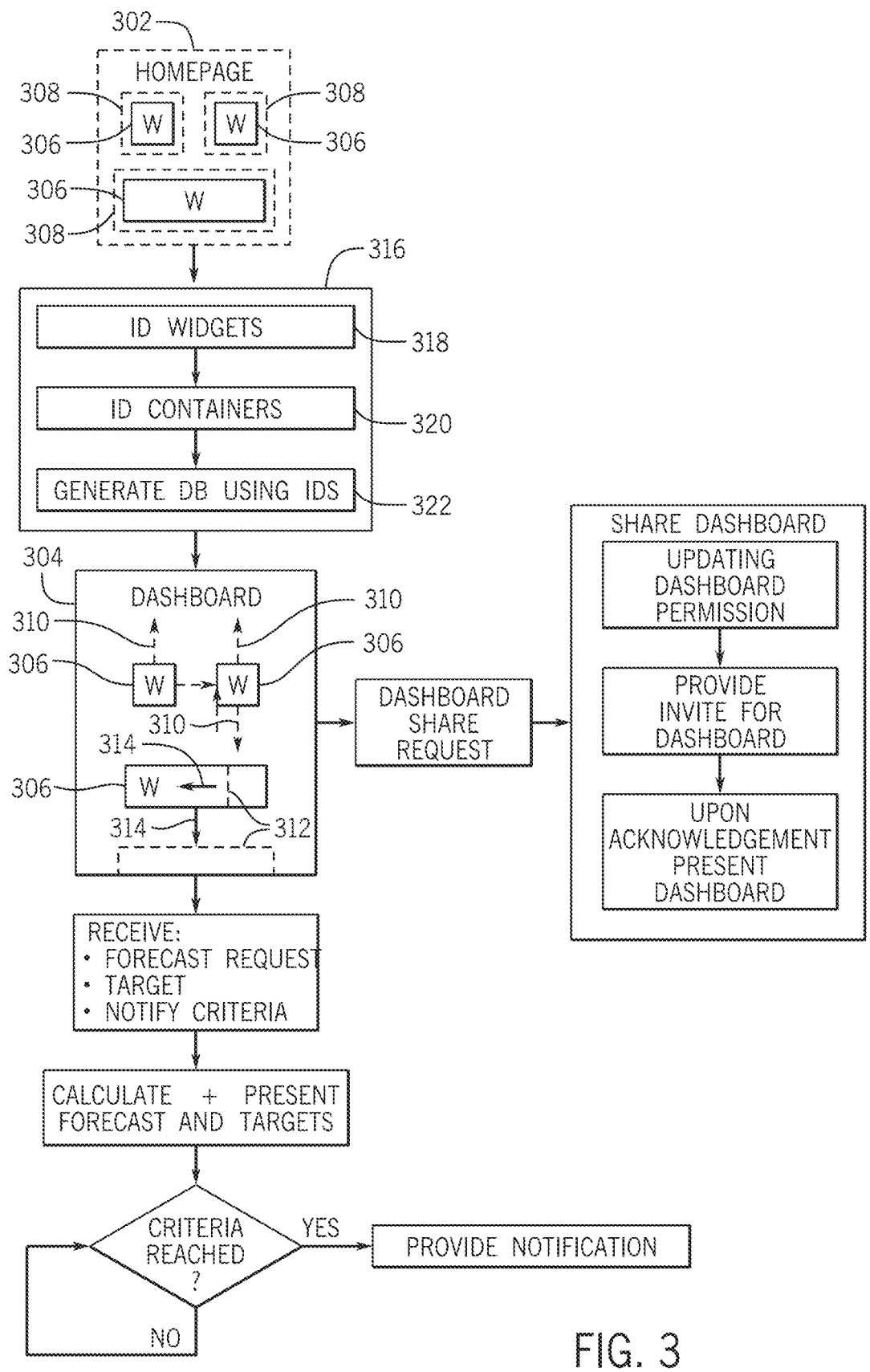
FIG. 3 is a block diagram illustrating performance analytics and reporting features facilitated through a homepage and/or dashboard, in accordance with an embodiment.

The discussion now turns to a mechanism for displaying system data, enabling interactivity with the system data, and reporting on the system data. FIG. 3 is a block diagram illustrating performance analytics and reporting (PAR) features facilitated through a homepage 302 and/or dashboard 304, in accordance with an embodiment. As used herein, a "homepage" refers to a graphical-user-interface (GUI) screen where data-driven widgets 306 may be placed in pre-defined containers 308 that have a static placement and/or size.

In some embodiments, it may be desirable to enable customized positioning and/or sizing of widgets 306. Accordingly, dashboard 304 may be used to provide such features. As used herein, the term "dashboard" refers to a graphical-user-interface (GUI) screen where data-driven widgets 306 may be placed on the screen without being constrained to pre-defined containers 308 and/or static placement and/or size. In other words, for dashboard 304, the widgets 306 may be dynamically moved to any location on the dashboard 304 without being constrained to pre-defined locations, as indicated by arrows 310. Further, the size of the widgets 306 may be dynamically altered in the dashboard 304, as indicated by the sizing indicators 312 and the arrows 314.

Figure 4:
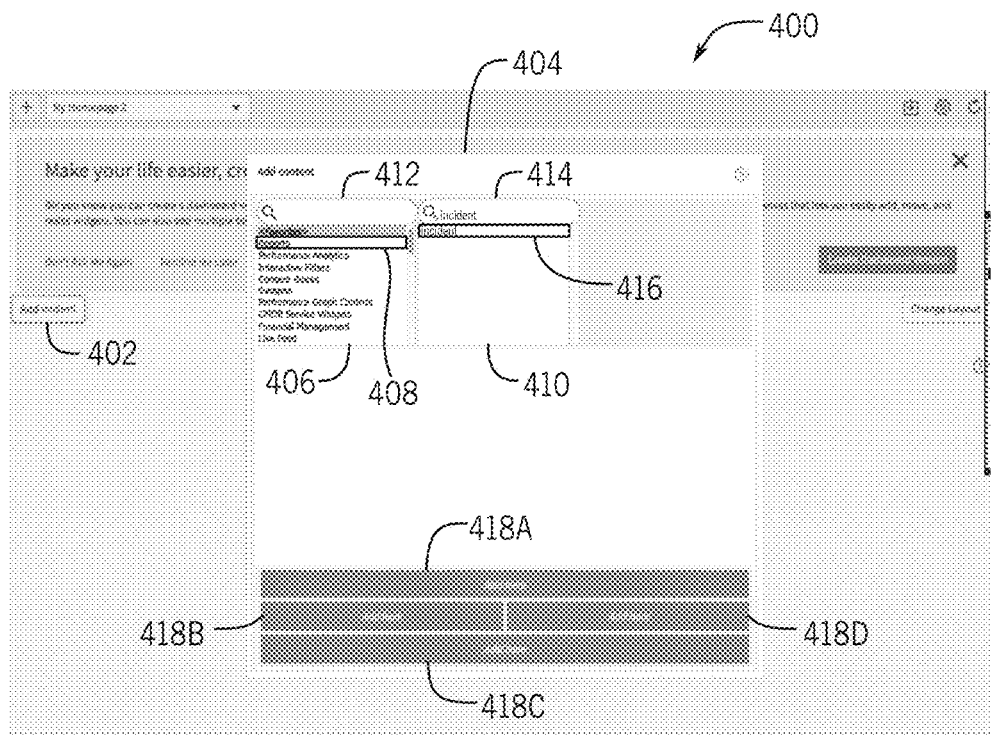
FIG. 4 is an illustration of a graphical-user-interface (GUI) for facilitating generation of analytics and/or reporting widgets on a homepage/dashboard, in accordance with an embodiment.

The widgets 306 may be independent data-driven software that perform particular tasks. For example, the widgets 306 may provide visualizations generated based upon datasets of the system. FIG. 4 is an illustration of a graphical-user-interface (GUI) 400 for facilitating generation of analytics and/or reporting widgets on a homepage/dashboard, in accordance with an embodiment. In the GUI 400, when an indication that new content should be added to the homepage 302 and/or dashboard 304 (e.g., via selection of the "Add content" button 402), a dialog box 404 is presented, enabling selection of particular widgets 306 from a list 406. For example, in FIG. 4, a reports widget selection 408 is selected. Based upon the selection in the list 406, a secondary list 410 may provide selections. In the depicted example, since the reports widget selection 408 was selected, available reports are presented in the secondary list 410.

Figure 5:
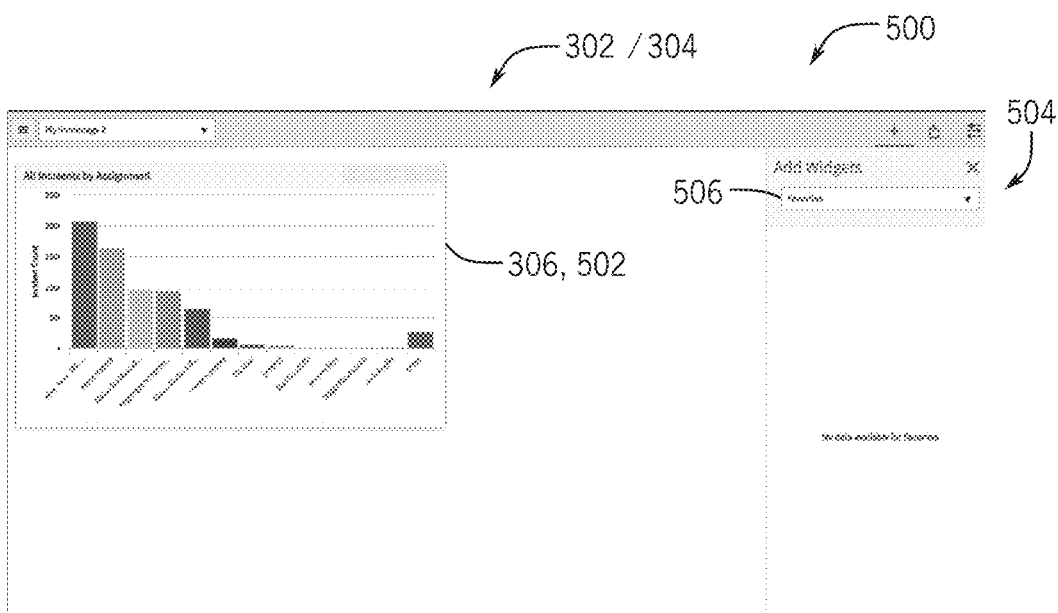
FIG. 5 is an illustration of a GUI for facilitating presentation of generated widgets, in accordance with an embodiment.

The lists 406 and/or 410 may be filtered based upon a text search 412 and/or 414, respectively. For example, in FIG. 4, the term "incident" is entered into text search 414, resulting in one report from the list containing the term "incident." As illustrated, the incident report selection 416 is selected. Upon indication that the selected widget (e.g., the incident report widget) should be added to the homepage 302 and/or dashboard 304 (e.g., via one of the positional "Add here" buttons 418A, B, C, or D), the widget 306 is added to the homepage 302 and/or dashboard 304. For example, FIG. 5 is an illustration of a GUI 500 presenting the widget 306 (e.g., the report widget 502) in a homepage 504, in accordance with an embodiment.

As illustrated, additional widgets 306 may be added via the GUI 500 (e.g., using the add widget sidebar 504. For example, the dropdown list 506 may provide a list of available widgets 306 that may be added to the homepage 302 and/or dashboard 304.

Figure 6:
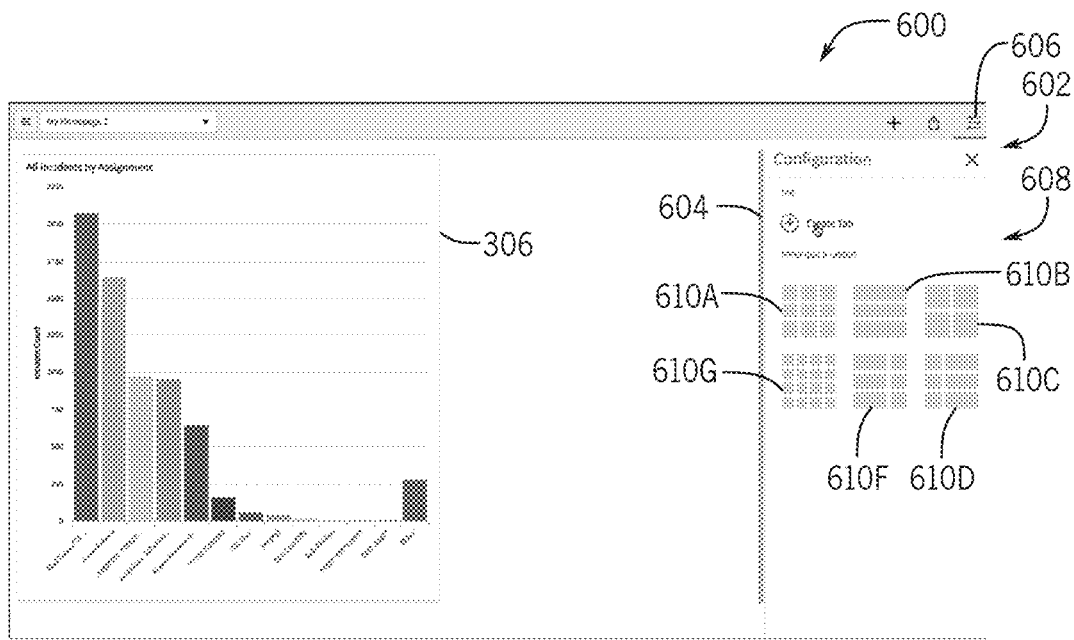
FIG. 6 is an illustration of a GUI for facilitating generation of new tabs in the homepage/dashboard, in accordance with an embodiment.

Additionally, new tabs may be created in a homepage 302 and/or dashboard 304. In FIG. 6, the GUI 600 illustrates a configuration dialog box/sidebar 602, accessed by selecting a configuration icon 606. The configuration dialog box/sidebar 602 includes a "Create Tab" option 604. The "Create Tab" option 604, when selected, generates an additional tab, where additional widgets 306 may be presented. The configuration dialog box/sidebar 602 may also include a "Quick Layout" section 608 including various layout selections (e.g. selections 610A, B, C, D, E, and F) for a layout of the widgets 306. The "Add Widget" icon 612 may result in re-accessing the add widget sidebar 504 of FIG. 5.

Figure 7:
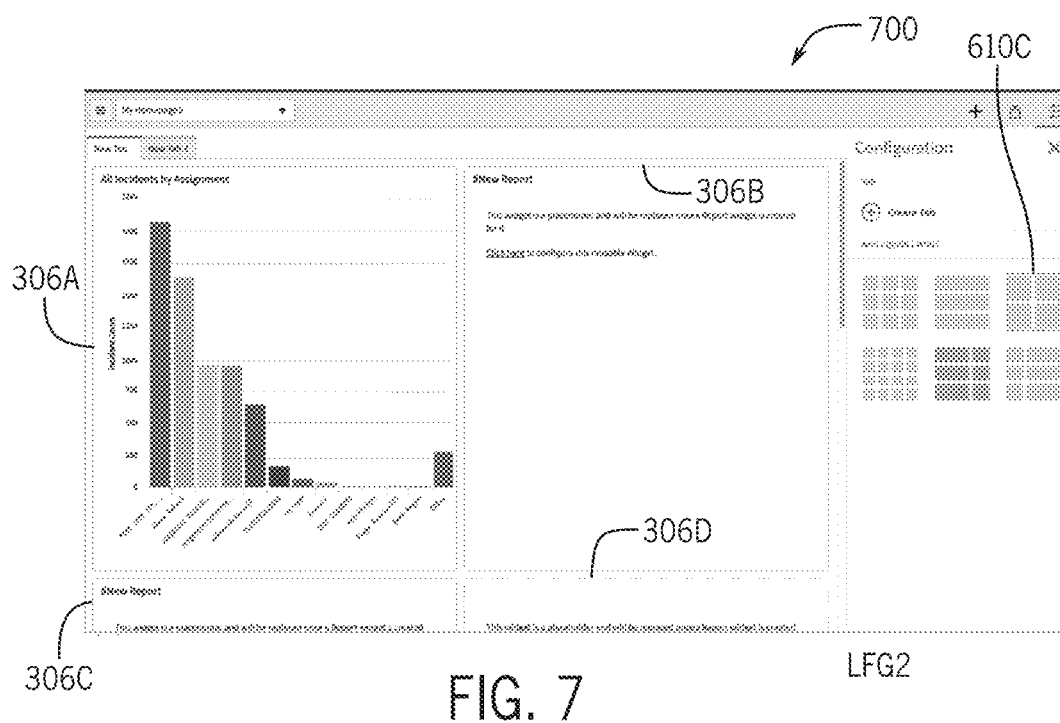
FIG. 7 is an illustration of a GUI for facilitating a layout configuration of the widgets, in accordance with an embodiment.

FIG. 7 is an illustration of a GUI 700 where a new Quick Layout selection 610C is selected after adding new widgets 306A, B, and C to the homepage 302 and/or dashboard 304, in accordance with an embodiment. As illustrated, the quadrant layout (e.g., selection 610C) is selected, resulting in arrangement of the four widgets 306A, 306B, 306C, and 306D with equal sizes in four quadrants of the homepage 302 and/or dashboard 304.

Figure 8:
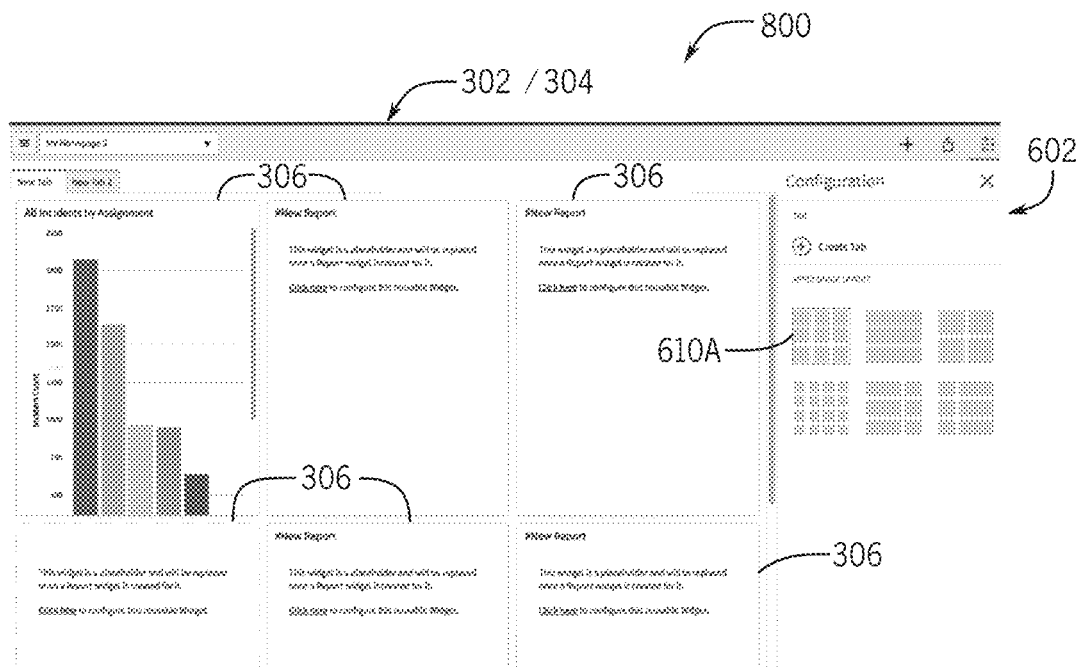
FIG. 8 is an illustration of a GUI for facilitating a modified layout, in accordance with an embodiment.

In FIG. 8, the GUI 800 illustrates a modified layout, in accordance with an embodiment. In the modified layout, selection 610A is selected, resulting in nine widgets displayed on the homepage 302 and/or dashboard 304. When the addition of new widgets 306 and configuration of the homepage 302 and/or dashboard 304 is complete, the configuration dialog box/sidebar 602 may be closed, resulting in a configured homepage 302/dashboard 304.

Figure 9:
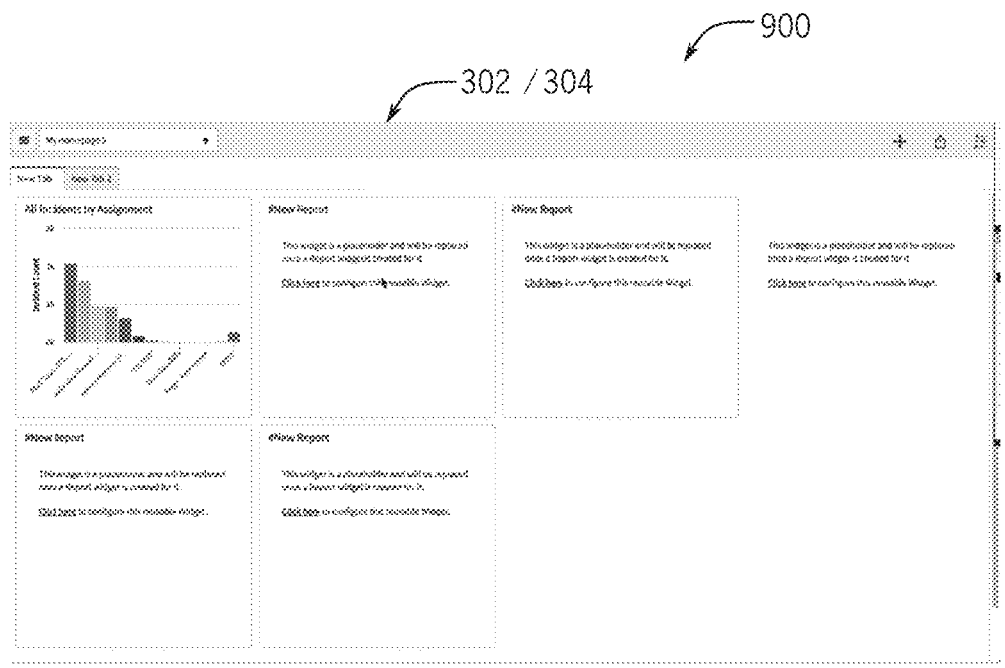
FIG. 9 is an illustration of a GUI for facilitating a configured layout, in accordance with an embodiment.

An example of a completed homepage 302/dashboard 304 is depicted in the GUI 900 of FIG. 9.

Returning to FIG. 3, as mentioned above, there may be more flexibility in configuring a dashboard 304 over a homepage 302. For example, widgets 306 may be placed in dynamic locations (e.g., not subject to placement within pre-sized/pre-placed containers 308. However, it may be burdensome to generate dashboards 304 from scratch after time and effort has already been afforded to creating a homepage 302. Accordingly, in some embodiments, a conversion process 316 may be implemented to convert a homepage 302 to a dashboard 304.

The conversion process 316 may identify the widgets 306 found on the homepage 302 (block 318). For example, a computer-readable representation of the homepage 302 (e.g., a homepage object) may be traversed to identify each of the widgets 306 on the homepage 302.

Further, the conversion process 316 may identify the containers 308 and their associated sizes and placements for the identified widgets 306 found on the homepage 302 (block 320). For example, the computer-readable representation of the homepage 302 (e.g., a homepage object) may be traversed to identify each of containers 308 containing the widgets 306 oh the homepage 302. Position and/or size attributes of the containers 308 may be identified by accessing object attributes of the computer-readable representation of the homepage 302.

Once the widgets 306 and the containers 308 and their attributes are identified. A corresponding dashboard 304 may be generated (block 322). For example, computer instructions may generate a computer-readable representation of the homepage 302, inserting the widgets 306 at the position and/or size identified by the container 308 attributes. Once the dashboard 604 is generated, it may be accessed and the size and position of the widgets 306 may be modified dynamically.

Figure 10:
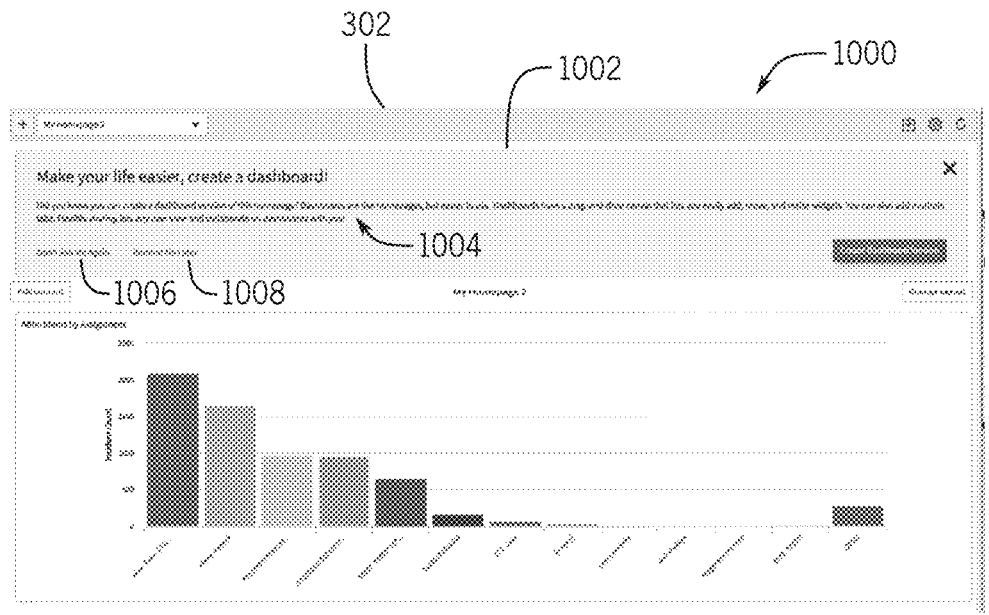
FIG. 10 is an illustration of a GUI for facilitating a conversion prompt from a homepage to a dashboard, in accordance with an embodiment.

Certain GUI prompts may facilitate homepage 302 conversion to a dashboard 304. For example, FIG. 10 is an illustration of a GUI 1000 that provides a conversion prompt 1002 for converting a homepage 302 to a dashboard 304, in accordance with an embodiment. As illustrated, the conversion prompt 1002 may provide an indication 1004 indicating the improvements of dashboards 304 over homepages 302. For example, in FIG. 10, the indication notes that "Dashboards have a drag-and-drop canvas that lets you easily add, move and resize widgets. You can also add multiple tabs." The indication 1004 also indicates that dashboards include flexible sharing, which will be discussed in more detail below. The conversion prompt 1002 may include a "Don't Ask Me Again" option 1006 that removes the conversion prompt 1002 without implementing the conversion process 316 of FIG. 3. Another option, the "Remind Me Later" option 1008 removes the conversion prompt 1002 for the current session, but re-displays the conversion prompt 1002 in subsequent sessions. A third option, the "Create Dashboard Version" option, triggers the conversion process 316 of FIG. 3.

Figure 11:
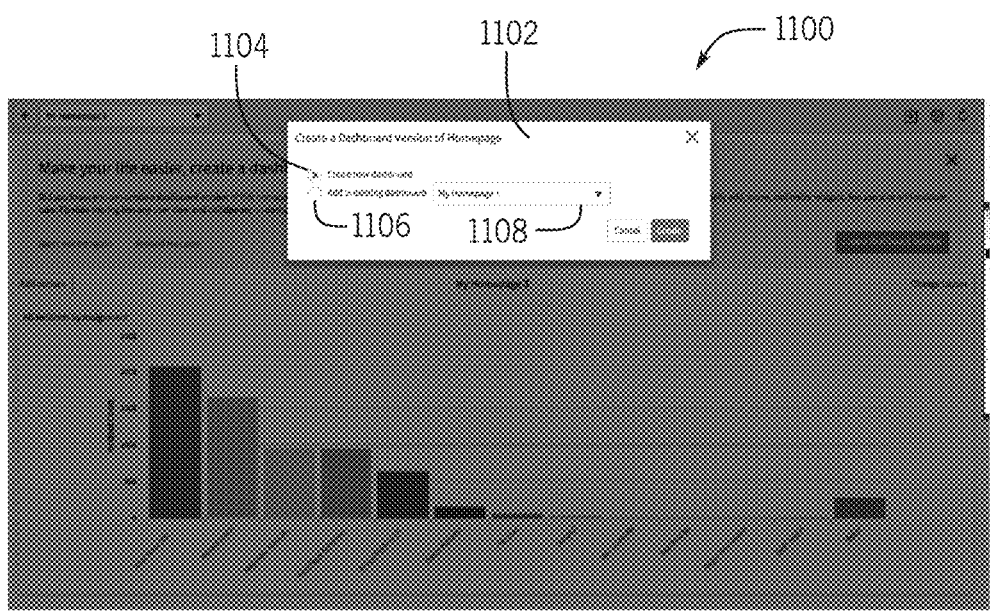
FIG. 11 is an illustration of a GUI for facilitating a dashboard destination prompt, in accordance with an embodiment.

Certain information regarding the conversion may be useful to complete the conversion process 316 of FIG. 3. FIG. 11 is an illustration of a GUI 1100 providing a dashboard destination prompt 1102, in accordance with an embodiment. The dashboard destination prompt 1102 prompts for a desired destination for the dashboard 304 conversion. Options include creating a new dashboard, by selecting option 1104 and/or adding the dashboard 304 conversion to an existing dashboard, by selecting option 1106. Option 1106 includes an associated selection list 1108, which provides a list of existing dashboards 304 accessible for editing. The selection list 1108, in some embodiments, may only provide dashboards 304 with which a currently logged in user has access to modify. Based upon a selection of one of the options 1104 or 1106, the widgets 306 of the homepage 302 will be transferred to either a new dashboard 304 or appended to an existing dashboard 304.

Figure 12:
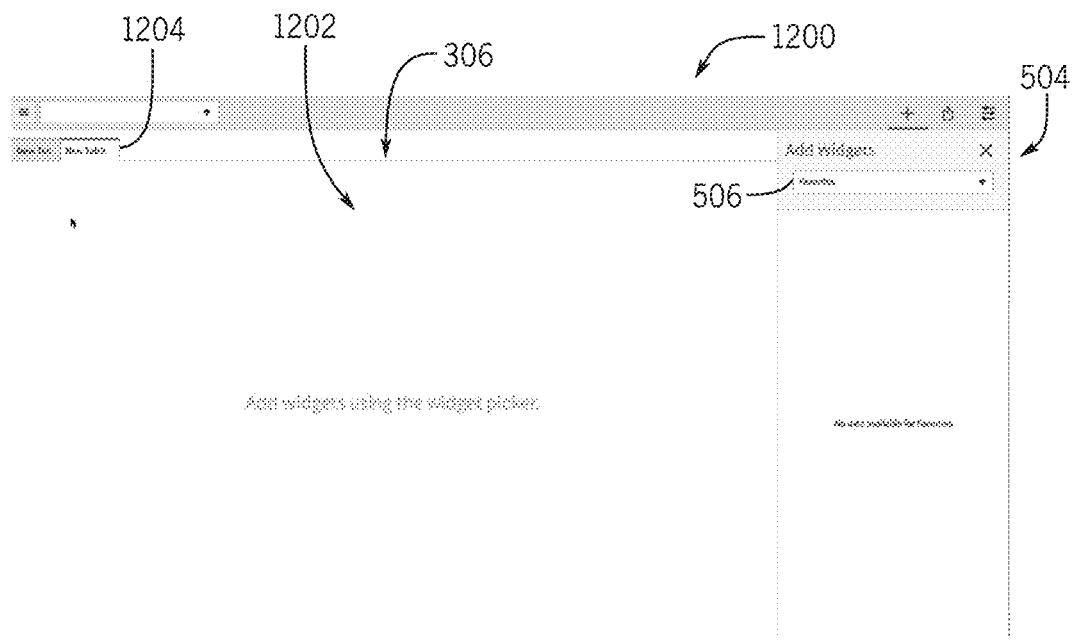
FIGS. 12 and 13 are illustrations of GUIs for facilitating addition of widgets to a homepage/dashboard, in accordance with an embodiment.
Figure 13:
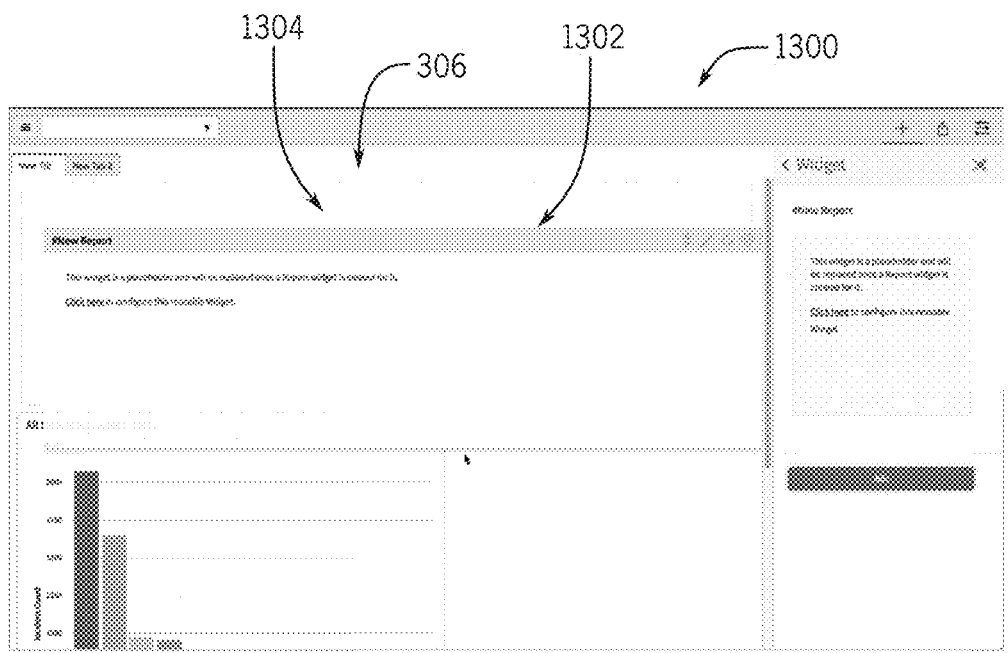
Figure 14:
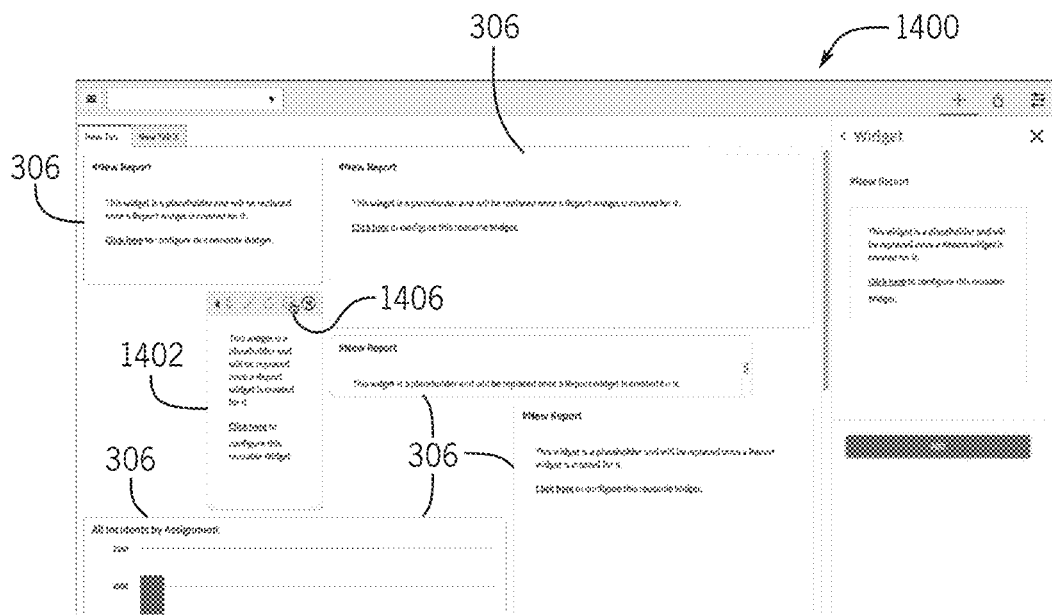
FIGS. 14 and 15 are illustrations of GUIs for facilitating widget editing on a homepage/dashboard, in accordance with an embodiment.
Figure 15:
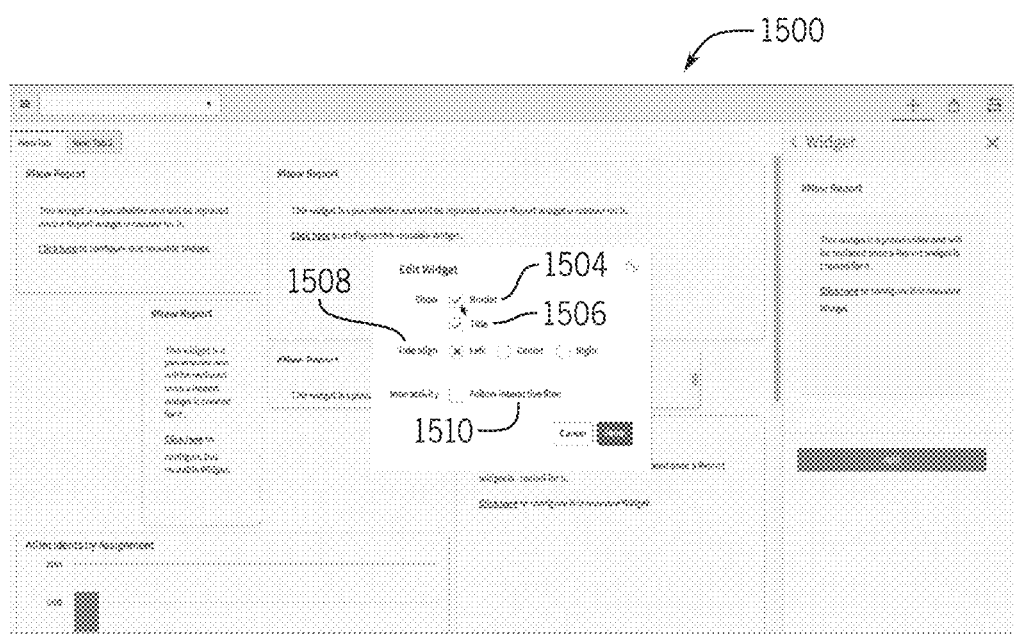

As mentioned above, dashboards 306 allow widgets 306 to be dragged and dropped into any location within a canvas of a dashboard 306. Further, the widgets 306 can be dynamically sized and re-arranged. Turning to a discussion of the dynamic widget positioning and resizing, FIG. 12 is an illustration of a GUI 1200 illustrating a blank canvas 1202 where widgets 306 may be placed. In FIG. 12, the canvas is formed on a second tab 1204 (e.g., similar to the tab created in FIG. 6). As previously discussed, a dialog box (e.g., the Add Widget sidebar 504) may be provided, such that a selection of a widget 306 may be selected from the selection list 506 and placed in the canvas 1202 (e.g., via drag and drop). For example, in FIG. 13, the GUI 1300 illustrates the "New Report" widget 1302 being dragged and dropped to the canvas 1304. FIG. 14 illustrates a GUI 1400 presenting dynamically resized and positioned widgets 306. In addition, in some embodiments, when a hover over occurs on one of the widgets 306, an edit bar 1402 may appear. The edit bar may include a configuration option 1406, which may be used to edit characteristics of the widget 306. For example, FIG. 15 illustrates a GUI 1500 where a characteristic editing dialog box 1502 is presented upon selection of the configuration option 1406. The characteristic editing dialog box 1502 may include a border option 1504 to selectively turn a border for the widget 306 on or off. Further, the title option 1506 may selectively turn a title presentation for the widget 306 on or off. The title align option 1508 may selectively determine whether the title of the widget 306 is left justified, right justified, or centered. The interactivity option 1510 selectively enables an interactive filter, which may filter some of the data from the report visualized by the widget 306, as will be discussed in more detail below.

Figure 16:
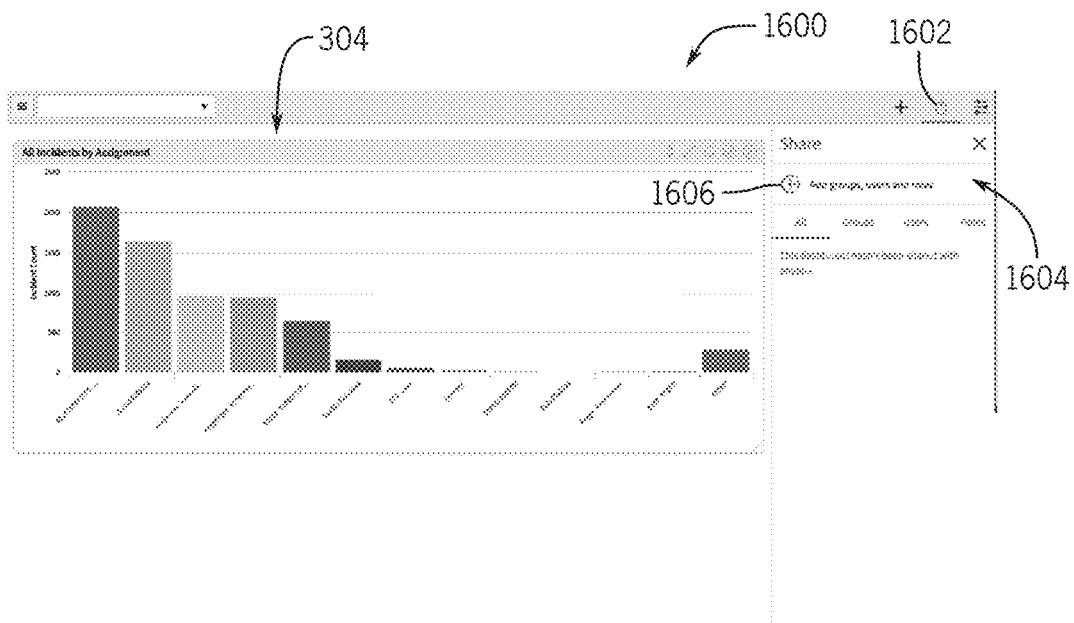
FIGS. 16-19 are illustrations of GUIs for facilitating sharing of a homepage/dashboard, in accordance with an embodiment.
Figure 17:
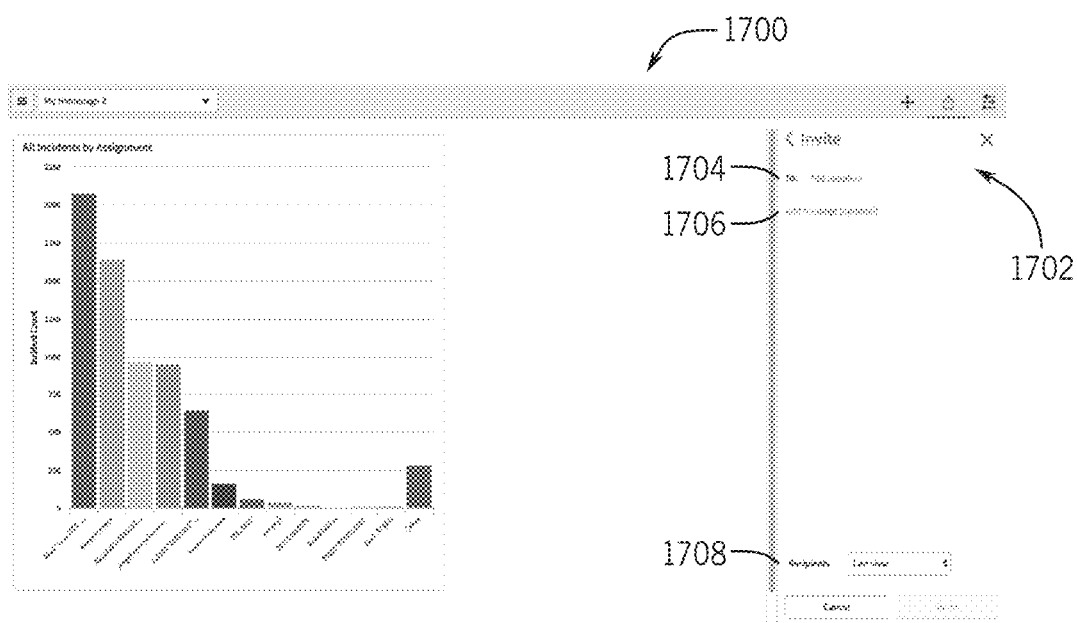
Figure 18:
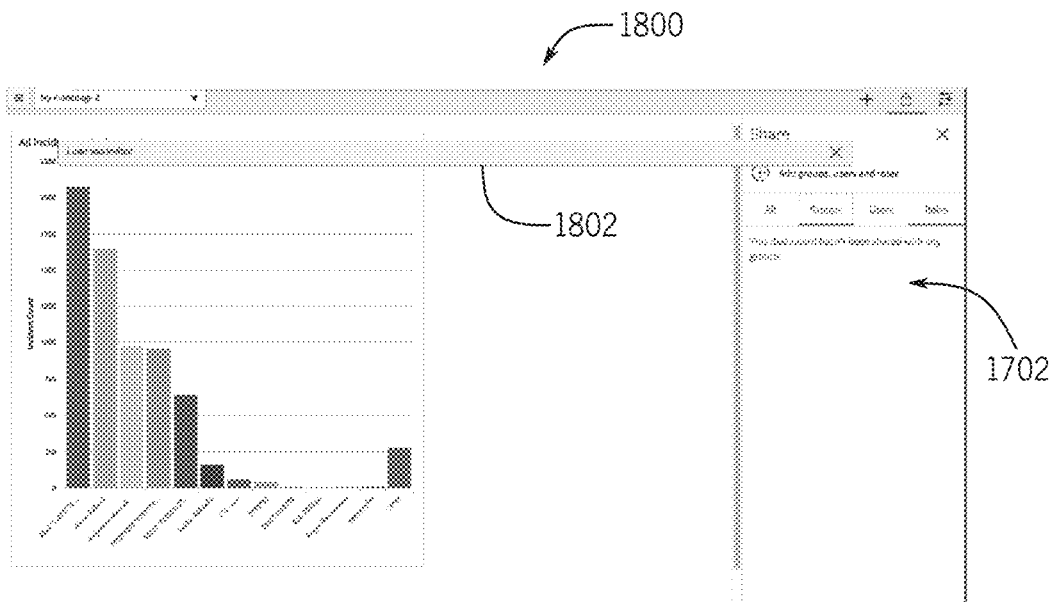
Figure 19:
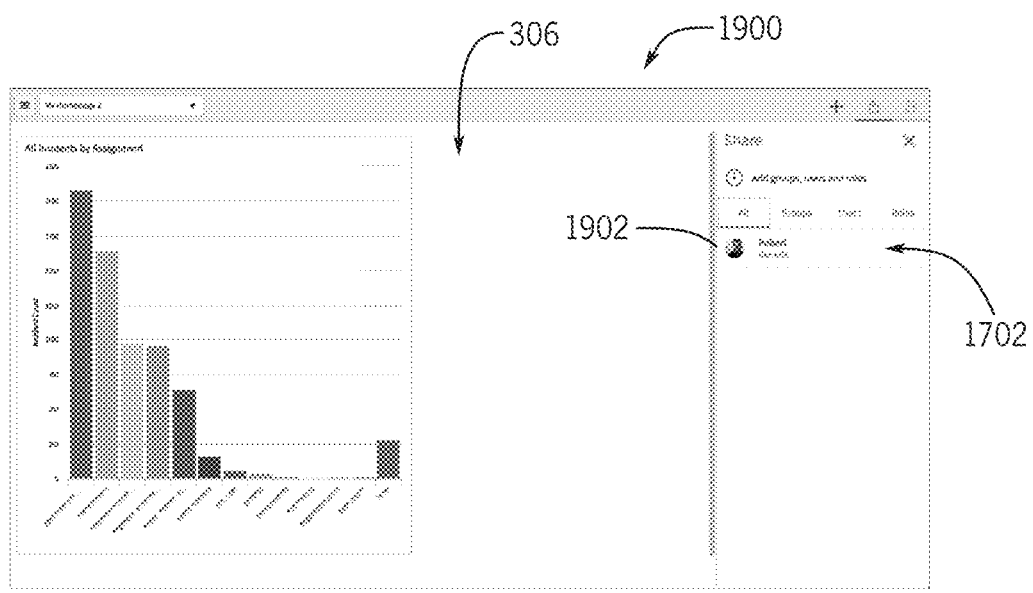

Further, as mentioned above, in some embodiments, dashboards 304 may be shareable. FIGS. 16-19 are illustrations of GUIs for facilitating sharing of a dashboard 304, in accordance with an embodiment. In FIG. 16, GUI 1600, a request for sharing is provided by selecting a sharing indicator 1602. Upon selection of the sharing indicator 1602, a sharing dialog box (e.g., sharing sidebar 1604) may be presented. In some embodiments, users, roles, and/or groups of users and/or roles may be selected as destinations for the shared dashboard 304. For example, when the add groups, users, and/or roles option 1606 is selected, the users, groups and/or roles may be selected. For example, in FIG. 17, GUI 1700 provides a new dialog box (e.g., the invite sidebar 1702). The invite sidebar 1702 includes a recipient field 1704 for the recipient (e.g., the group, user, and/or role), a message field 1706 where an option message may be provided when the sharing notification is sent, and an access rights field 1708 where access rights associated with the share may be provided. For example, the access rights may include view rights, edit rights, delete rights, etc.

Once the invitation is sent, a notification may be provided. For example, in FIG. 18, GUI 1800 displays a notification 1802 indicating that one user was invited. Upon acceptance of the invitation, a notification may be provided in the share sidebar 1702. For example, in FIG. 19, the GUI 1900 provides a shared indicator 1902 in the share sidebar 1702. For example, in FIG. 19, the shared indicator 1902 indicates that the dashboard 306 is being shared with the user "Robert".

Performance Analytics

Figure 20:
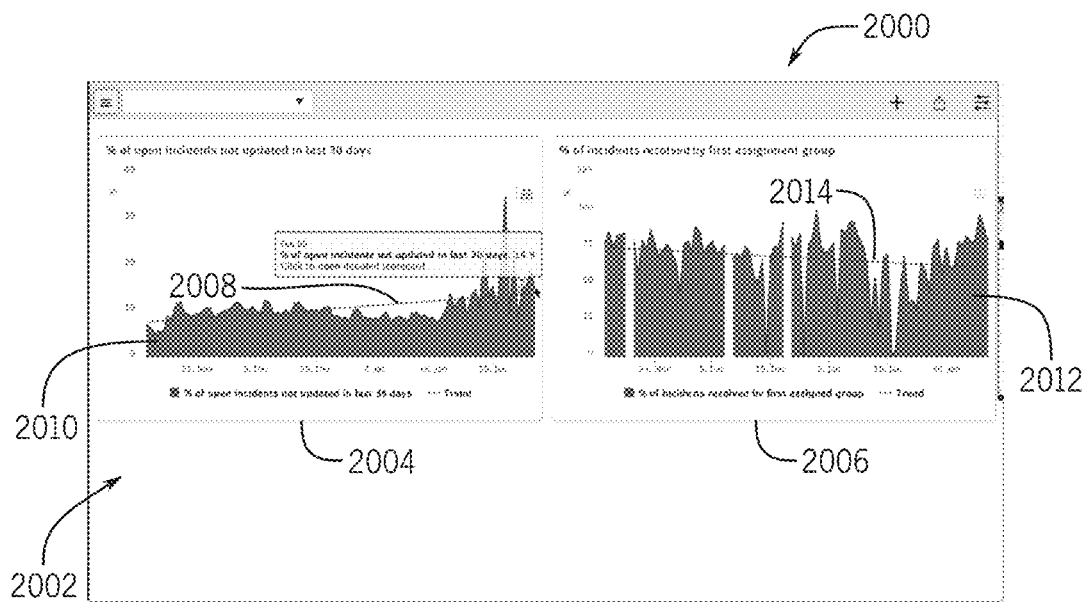
FIG. 20 is an illustration of a GUI of a performance analytics widget dispose on the homepage/dashboard, in accordance with an embodiment.

Turning now to a discussion of a particular widget 306, called the performance analytics widget, FIG. 20 is an illustration of a GUI 2000 of a performance analytics widget 2002 positioned on the homepage 302 and/or dashboard 304, in accordance with an embodiment. The performance analytics widget 2002 provides a visualization of key performance indicators (KPIs) and metrics. In the current embodiment, two data plots 2004 and 2006 are provided. Data plot 2004 provides an indication of a percentage of open incidents (X-axis) over a period of time ranging from the last 30 days (Y-axis). Additionally a trend 2008 is defined and presented based upon the data 2010 in the data plot 2004. The data plot 2006 includes data 2012 indicating a percentage of incidents resolved by a first assignment group (X-axis) over a period of time (Y-axis). Further, a trend 2014 is defined and presented based upon the data 2012.

Figure 21:
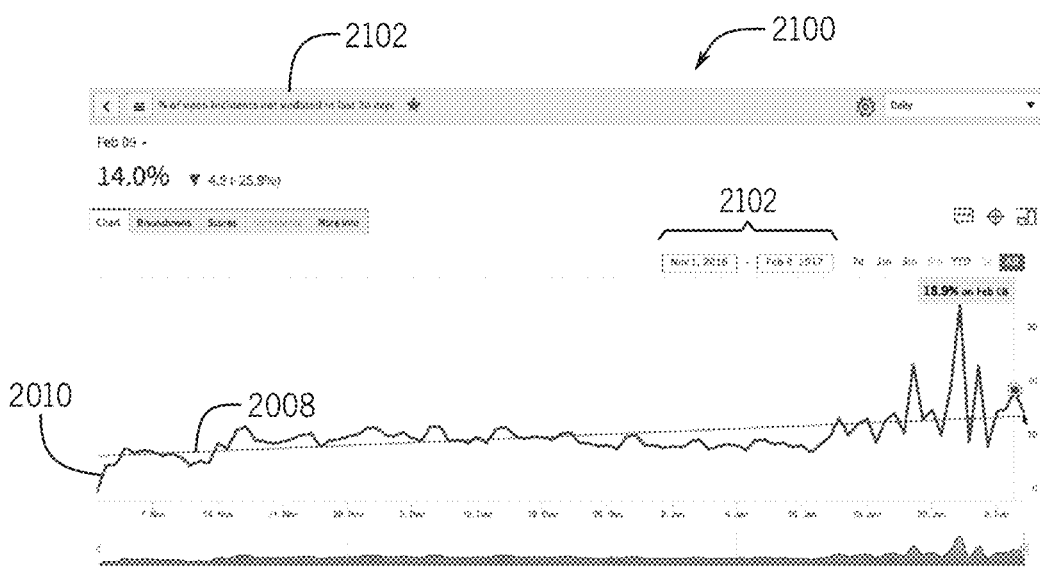
FIG. 21 is an illustration of a GUI that provides a deep-dive into the performance analytics widget of FIG. 20, in accordance with an embodiment.

When one of the plots 2004 and/or 2006 is selected, the GUI 2000 may transition to a larger view of the data with additional options. FIG. 21 is an illustration of a GUI 2100 that provides a deep-dive into the performance analytics widget 2002 of FIG. 20, based upon the selection of the data plot 2004, in accordance with an embodiment. The title 2102 illustrates the title of the data plot 2004 of FIG. 20. Further, a range selector 2102 enables selection of a new range for the data 2010.

Figure 22:
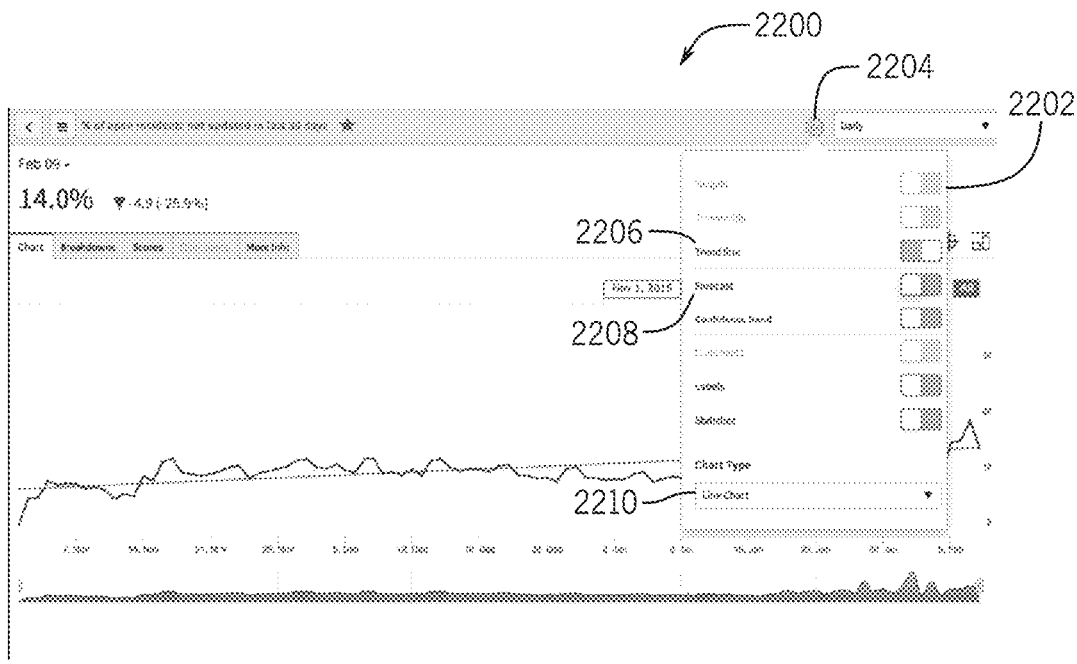
FIG. 22 is an illustration of a GUI for facilitating a variety of performance analytics tasks, in accordance with an embodiment.
Figure 23:
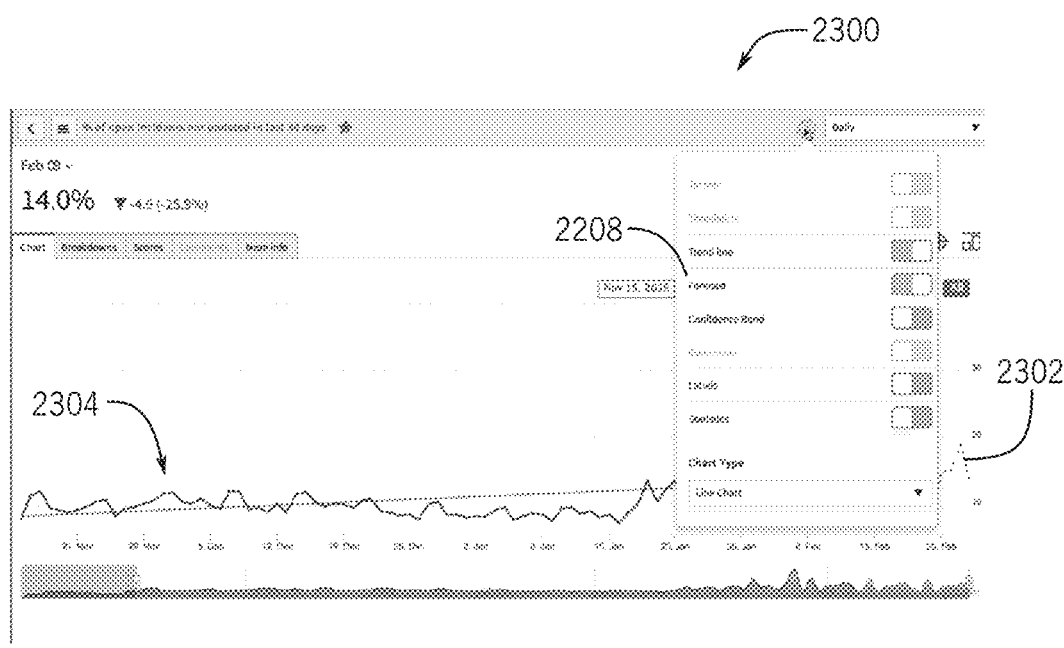
FIG. 23 is an illustration of a GUI where forecast analytics are triggered, in accordance with an embodiment.

Additional options may be selectable. For example, in FIG. 22, the GUI 2200 provides a configuration menu 2202, triggered by a configuration icon 2204. As illustrated, the trend visualization may be selectively turned on or off using the trend option 2206. Forecasting (e.g., predicting future data) may be selectively turned on or off using the forecast option 2208. Other options, such as visualization of a confidence band, labels, and/or statistics may also be selectively turned on or off. Further, the chart type may be changed from a line chart to other forms of charts (e.g., bar chart) using the chart type option 2210. In GUI 2300 of FIG. 23, the forecast analytics are triggered by selecting the forecast option 2208. The forecast analytics run and forecasting data 2302 is presented in the line chart 2304.

Figure 24:
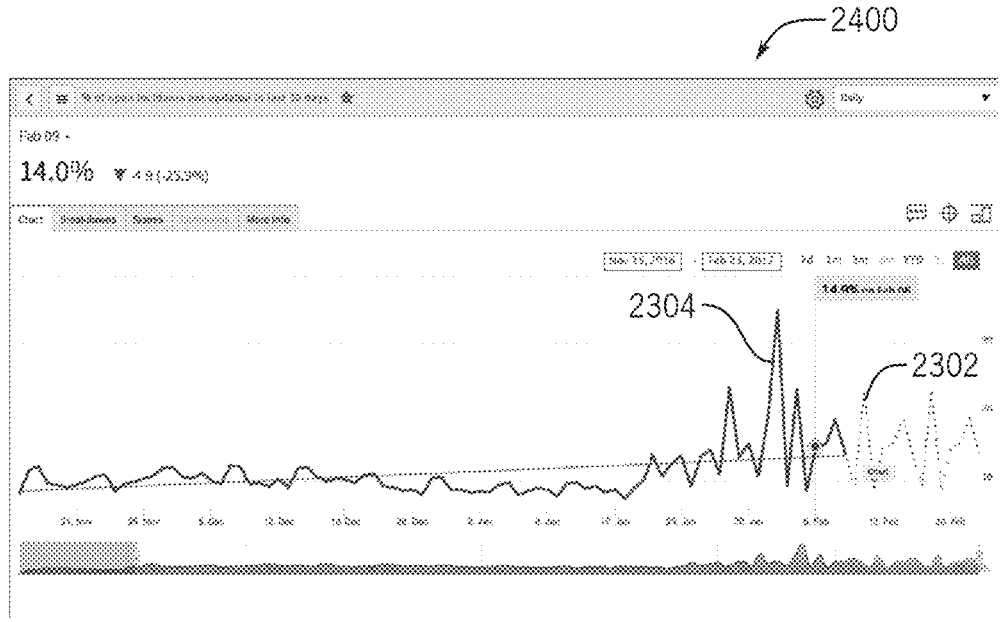
FIG. 24 is an illustration of a GUI where forecast analytics are provided, in accordance with an embodiment.

FIG. 24 is an illustration of a GUI 2400 where the configuration menu 2202 is removed, showing the forecasting data 2302 results from the triggered forecast analytics. As illustrated, the forecasting data 2302 may be differentiated from observed data 2304. For example, the forecasting data 2302 may be represented in a different color, as a dashed line, etc.

Figure 25:
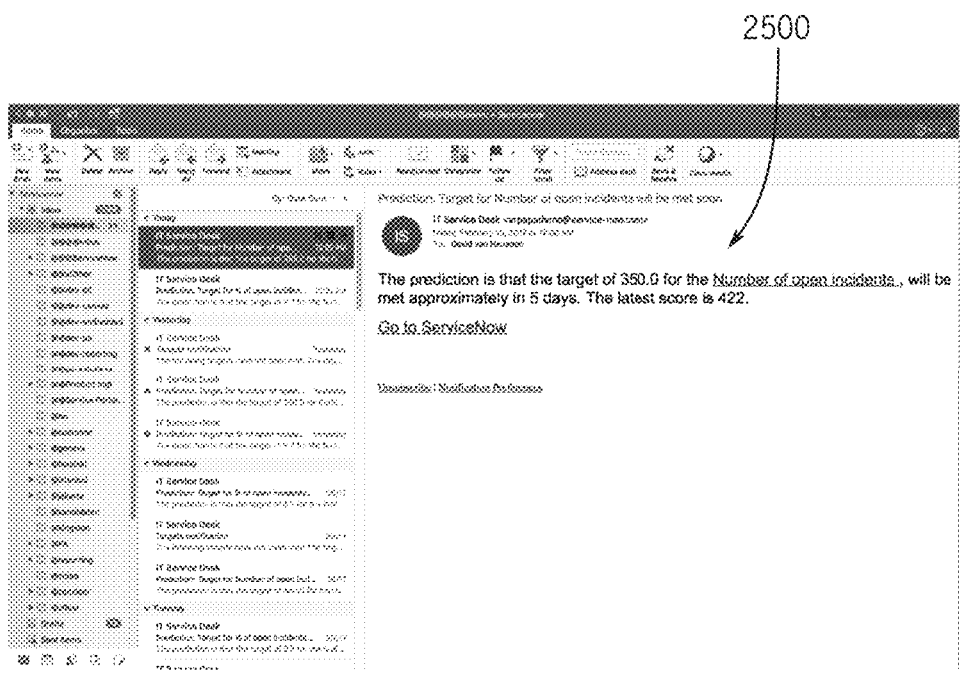
FIG. 25 is an illustration of an email notification of a prediction, in accordance with an embodiment.

The forecasting data 2302 may be used to predict when certain targets and/or thresholds may be met. FIG. 25 is an illustration of an email notification 2500 of a prediction, in accordance with an embodiment. The email notification 2500 presents a notification that a specified target (e.g., 350) for a particular indicator (e.g., Number of open incidents) will occur at a predicted time (e.g., in 5 days) based upon the forecasting data 2302 of FIG. 24.

Figure 26:
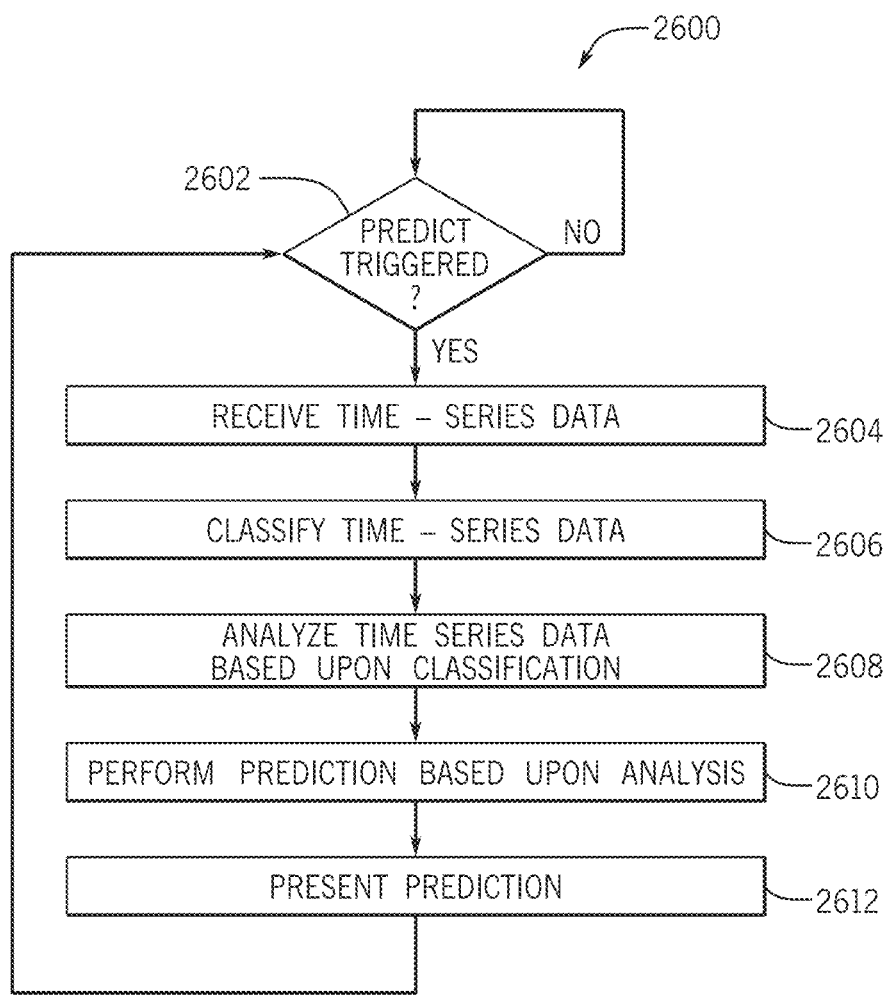
FIG. 26 is a flowchart, illustrating a process for prediction analysis, in accordance with an embodiment.

FIG. 26 is a flowchart, illustrating a process 2600 for prediction analysis, in accordance with an embodiment. The system determines whether a prediction is triggered (decision block 2602). For example, as mentioned above, the prediction may be triggered by selecting the forecast option 2208 of FIG. 23. The system continues to determine if predictions are triggered.

When predictions are triggered, time-series data is received (block 2604) and is classified (block 2606). For example, the time-series data may be mined for data patterns of the time-series data. Based upon observed patterns, the time-series data may be classified into one of a particular classification types. For example, the time-series data may be classified as having seasonal components (certain commonalities at certain times), near constant (e.g., retaining nearly the same values over a period of time), trending data, data that switches between two or more states, and/or categorical data (data that includes a set of discrete values).

Once classified, the time-series data may be analyzed based upon the classification (block 2608). For example, any trends of trending data may be used to predict future values. Estimations of the future time-series data may be inferred based upon the analysis. For example, the patterns from observed time-series data may be likely to occur in future time periods. Accordingly, patterns for the observed time-series data, along with any trends present in the observed time-series data may be used to generated forecasting data 2302. For example, a trend slope for a linear trend may be used to extrapolate future predictions.

Predictions of subsequent data may be determined based upon the time-series data. For example, as mentioned above, the forecasting data 2302 may be used to predict when certain targets and/or thresholds may be met. The predictions may be presented in the homepage 302, dashboard 304, or via other mechanisms, such as email, as depicted in FIG. 25.

Figure 27:
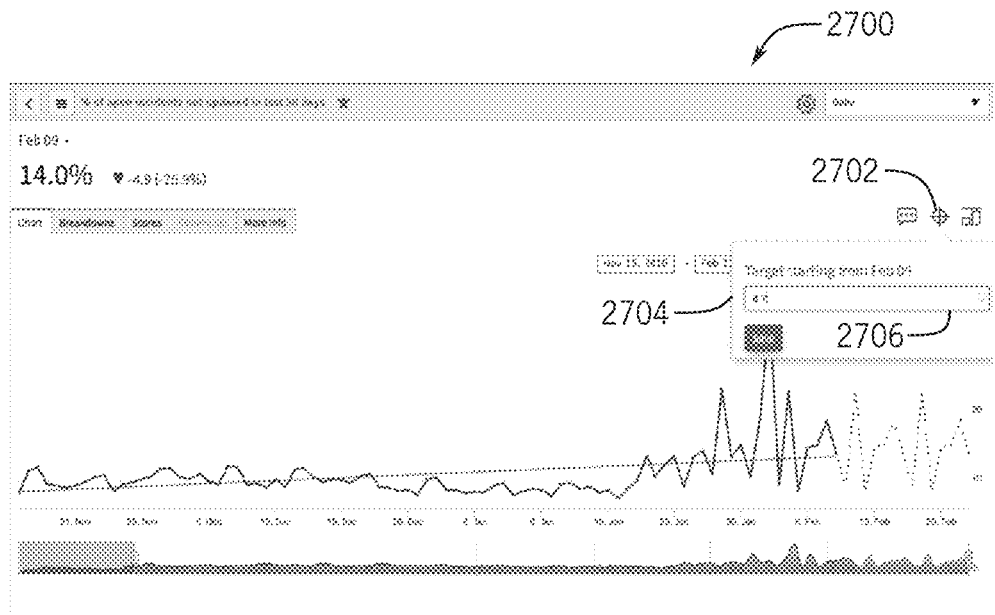
FIGS. 27 and 28 are illustrations of GUIs for facilitating targeting analytics, in accordance with an embodiment.

FIG. 27 illustrates a GUI 2700 where target prediction is triggered. Target prediction may be triggered by selecting a targeting icon 2702. Upon selection of the targeting icon 2702, a target dialog box 2704 is presented. The target dialog box 2704 may include a prompt 2706 for input of a target value. Once the target value (e.g., 8.7) is entered and saved, the GUI may provide an indication of when the target will be met.

Figure 28:
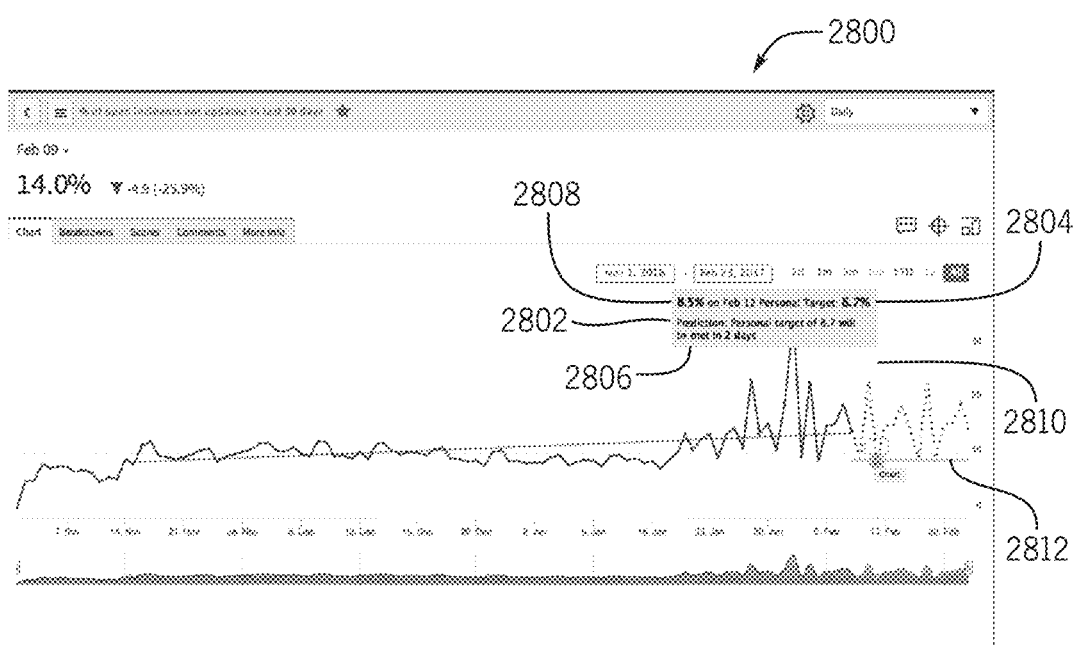

FIG. 28 illustrates a GUI 2800 where a target prediction 2802 is presented based upon the target value input in the target dialog box 2704 of FIG. 27. In certain embodiments, the target dialog box 2802 may include an indication 2804 of the target value input, an indication 2806 of a date and/or time when the target value will be met, and an indication 2808 of an actual forecasted value for the date and/or time. The target prediction 2802 may include a pointer 2810 and point 2811 that indicates the time and/or point on the chart where the target is met. Further, in some embodiments, target visualization 2812 may provide an indication of the previously submitted target value input.

Figure 29:
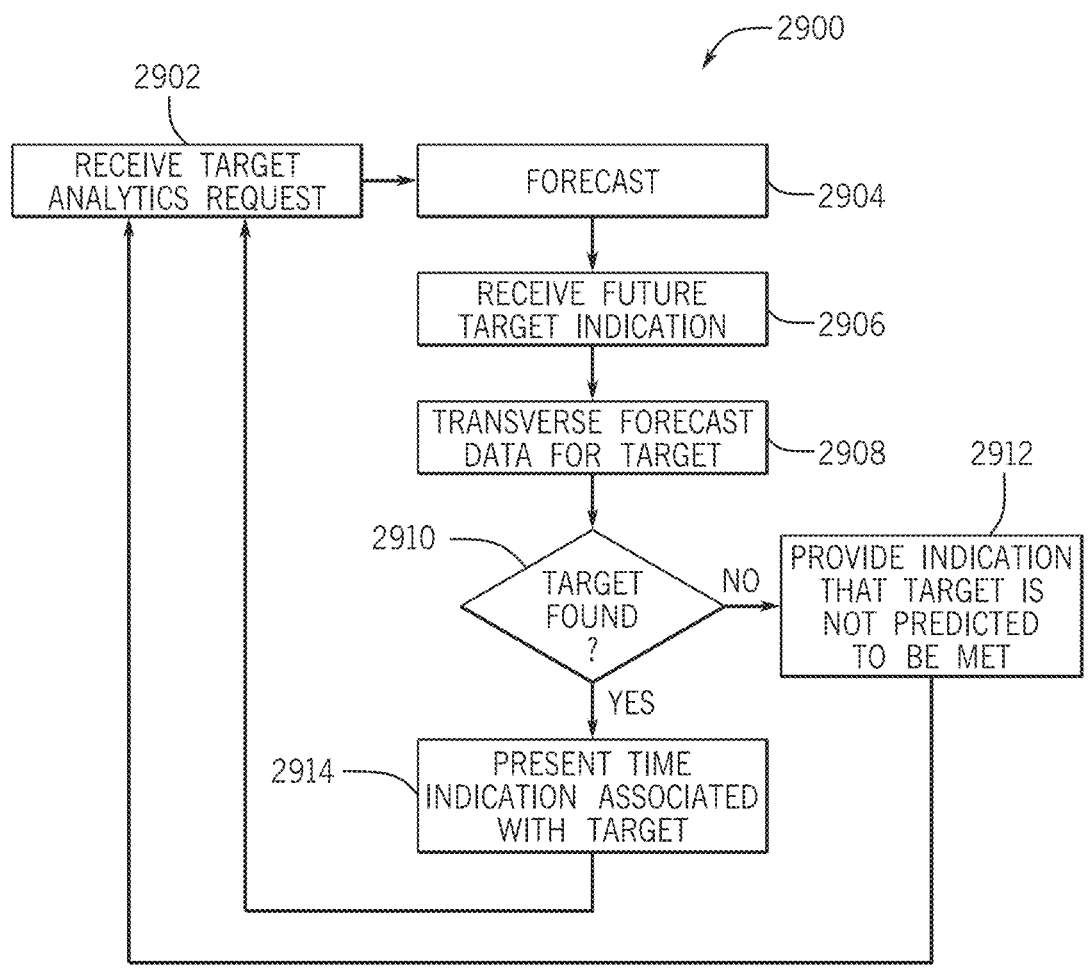
FIG. 29 is a flowchart, illustrating a process for target analysis, in accordance with an embodiment.

FIG. 29 is a flowchart, illustrating a process 2900 for target analysis, in accordance with an embodiment. The process 2900 may begin by receiving a target analytics request (block 2902). For example, as mentioned above, the request may be triggered by selecting the icon 2702 of FIG. 27.

The process 2900 continues by performing forecasting on observed time-series data (block 2904) and receiving a future target indication (block 2906). The forecasting data provides predicted future data, enabling the system find future periods where the future target indication may be satisfied. The forecast data is traversed to find periods whether the target may be satisfied (block 2908). If the target indication is not found in the forecast data (decision block 2910), an indication that the future target is not predicted to be met within the forecasting period. However, when the target indication is found, an indication associated with the target is presented (block 2914). For example, as mentioned above, the target indication 2802 of FIG. 28 may be provided.

Figure 30:
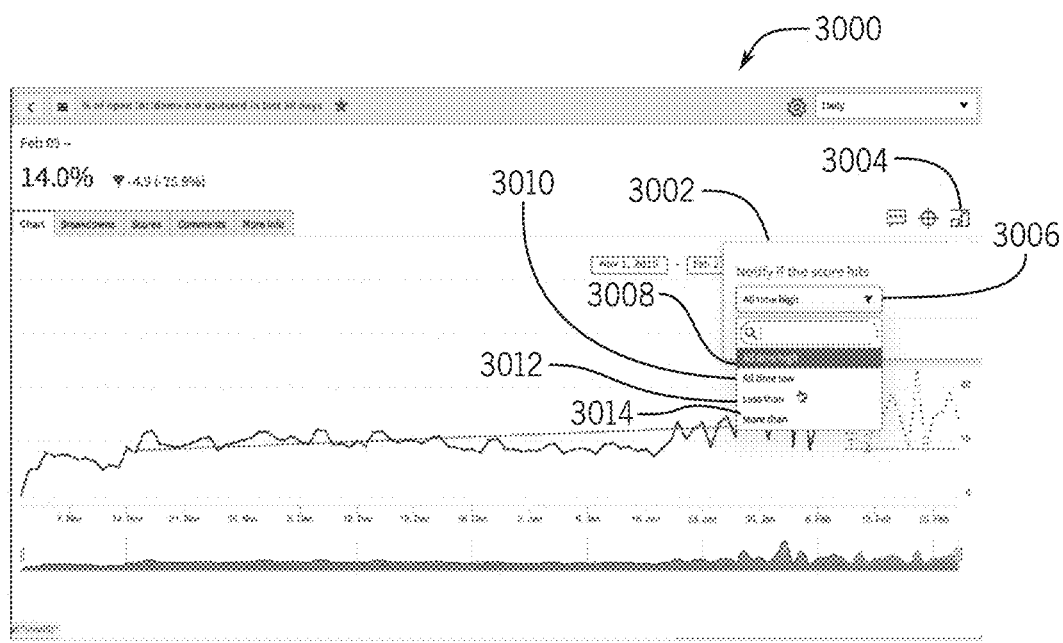
FIGS. 30-32 are an illustration of GUIs for providing notification functionality, in accordance with an embodiment.
Figure 31:
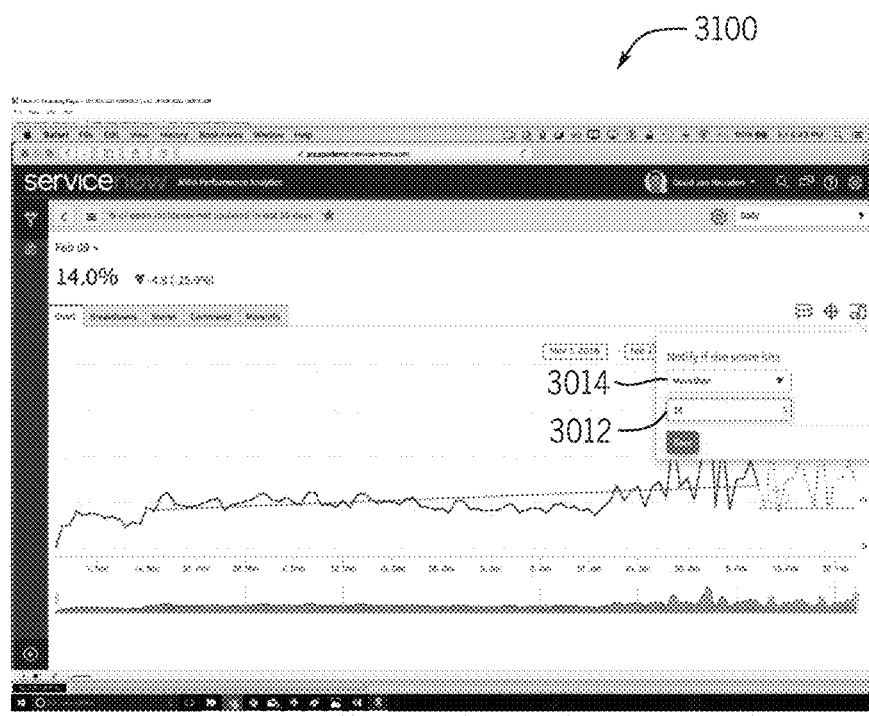

In some embodiments, notifications may be triggered based upon certain criteria. For example, GUI 3000 of FIG. 30 presents a notification dialog box 3002 when triggered by selecting a notification icon 3004. In some embodiments, the notification criteria may be selected from selection list 3006. The selection list 3006 may include an all time high option 3008, an all time low option 3010, a less than option 3012, and a more than option 3104. The all time high option 3008 triggers a notification if the time-series data breaches an all time high value for the time-series data. The all time low option 3010 triggers a notification if the time-series data breaches an all time low value for the time-series data. The less than option 3012 triggers a notification when the time-series data falls below a specified lower threshold. The more than option 3014 triggers a notification when the time-series data breaches a specified upper threshold. For example, in the GUI 3100 of FIG. 31, when the more than option 3014 is selected, an additional prompt 3102 is provided, enabling input of the threshold value (e.g., 14).

Figure 32:
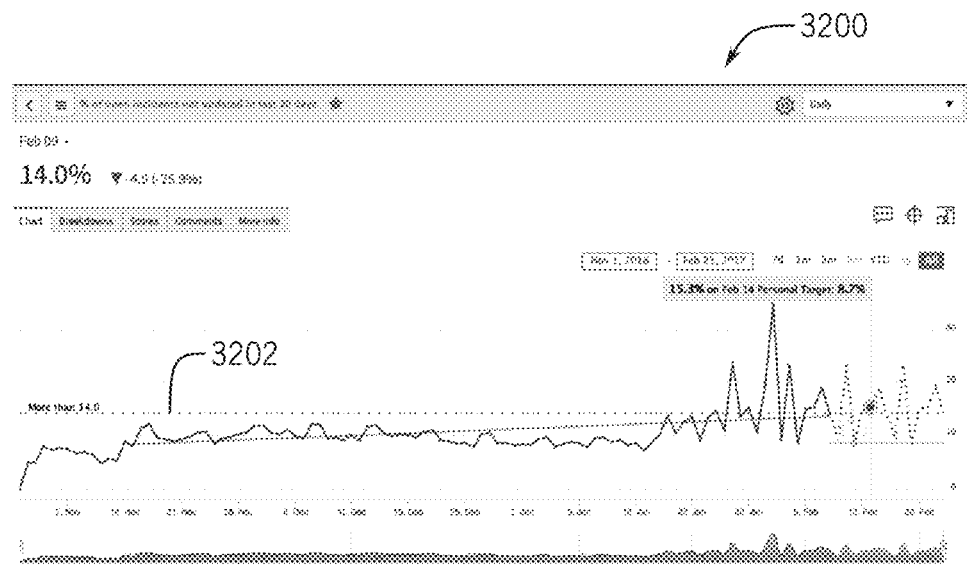

In some embodiments, once the notification criteria are set, a visualization of the threshold may be provided. For example, in FIG. 32, the GUI 3200 provides a more than threshold indicator 3202.

Figure 33:
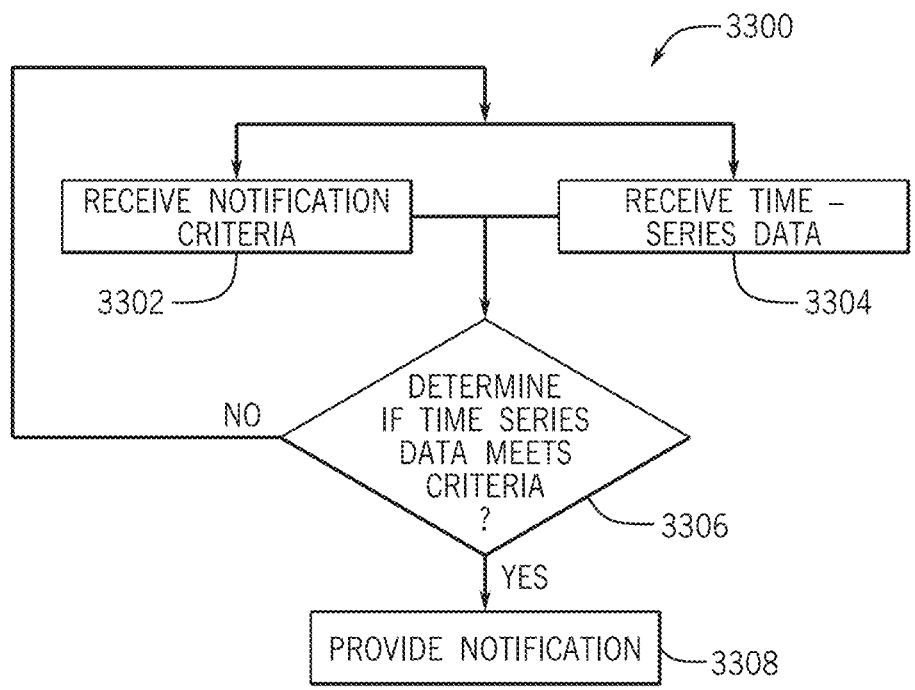
FIG. 33 is a flowchart, illustrating a process for data notification, in accordance with an embodiment.

Turning now to provision of the notifications, FIG. 33 is a flowchart, illustrating a process 3300 for data notification, in accordance with an embodiment. The process begins by receiving the notification criteria (block 3302) and the time-series data (block 3304). Next, a determination is made as to whether the time-series data meets the notification criteria (decision block 3306). If the time-series data does not meet the notification criteria, the system continues to receive new notification criteria and/or new time-series data. Otherwise, when the time-series data does meet the criteria, a notification is proved (block 3308). For example, the notification may be visually presented on the home screen 302 and/or the dashboard 304 and/or an email.

Interactive Analysis

Figure 34:
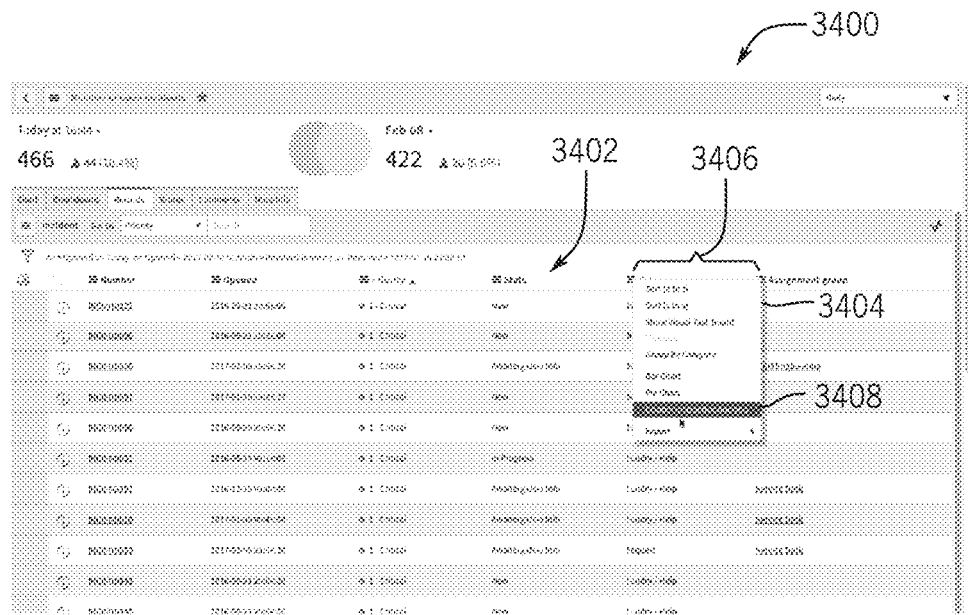
FIG. 34 is an illustration of a GUI where interactive analysis is triggered from a visualized list, in accordance with an embodiment.

As mentioned above, it may be beneficial to provide interaction with accumulated data. The following discussion relates to providing interactive analysis tools (e.g., a widget 306) that facilitates such interaction. FIG. 34 is an illustration of a GUI 3400 where interactive analysis is triggered from a visualized list 3402 of accumulated data, in accordance with an embodiment. As illustrated in FIG. 34, the GUI 3400 may provide a secondary menu 3404 related to a column of the list 3402 (e.g., category column 3406) when a secondary selection of the column (e.g., via a right-button-click) of the column. The secondary menu 3404 may include an option 3408 to initiate an Interactive Analysis function.

Figure 35:
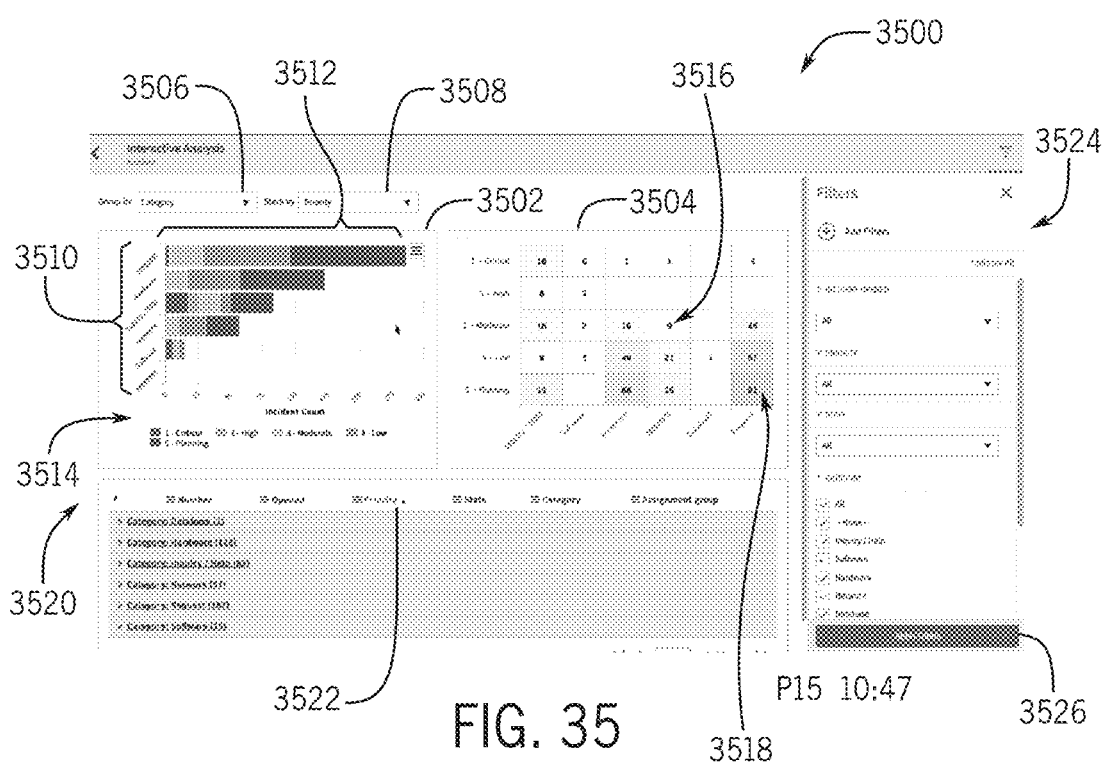
FIG. 35 is an illustration of a GUI providing an interactive analysis of the visualized list of FIG. 34, in accordance with an embodiment.

Upon receiving a request to initiate the Interactive Analysis function (e.g., via selection of the option 3408), an Interactive Analysis GUI may be displayed. For example, FIG. 35 is an illustration of a GUI 3500 that provides Interactive Analysis functionality based upon the column of the visualized list of FIG. 34 associated with the request, in accordance with an embodiment. In the current embodiment, the GUI 3500 includes a stacked bar chart widget 3502 and a heat map widget 3504 based upon the column of FIG. 34 related to the Interactive Analysis request (e.g., the category column 3406). For example, in the current embodiment, the GUI 3500 defaults to display of the data (e.g., incident data) based upon a grouping by column of FIG. 34. Further, in some embodiments, a default stacking characteristic may be selected for presentation of the chart widget 3502 and the heat map widget 3504. For example, in FIG. 34 the default stacking characteristic is set to priority. The grouping and stacking characteristics may be modified by selecting new columns of the list 3402 using the selectors 3506 and/or 3508, respectively.

As illustrated, the bars 3510 may represent the groups indicated by the indicator 3506 (e.g., the category) and the stacks 3512 within the bars may be color-coded (or otherwise differentiated) in the bar chart. The stacks 3512 represent the stacking characteristic indicated by the indicator 3508, as illustrated by the key 3514.

Further, the heat map widget 3504 may include the group by characteristic in one axis (e.g., X-axis) of the heat map widget 3504 and the stack by characteristic in another axis (e.g., the Y-axis) of the heat map widget 3504. Counts of data elements matching intersecting group by characteristics and stack by characteristics are provided in the heat map widget 3504. For example, the heat map widget 3504 identifies that nine network incidents of a moderate priority are found in the list 3402, as indicated by count 3516. In some embodiments, differing color shades may be used to indicate a relative magnitude of the counts. For example, in FIG. 35, the largest count 3518 is relatively the darkest of the counts.

In addition, the GUI 3500 may present a collapsed list 3520, grouped by the group by characteristic indicated by the indicator 3506. The collapsed list 3520 may be sorted, by default, based upon the stack by characteristic indicated by the indicator 3508. For example, in FIG. 35, the sorting default is set to priority, as depicted by the sorting indicator 3522.

The GUI 3500 may also include a filtering dialog box (e.g., sidebar) 3524, which may enable further filtering of the data presented in the GUI 3500. For example, as will be discussed in more detail below, the visualized data in the bar chart widget 3502, the heat map 3504, and the collapsed list 3520 may be filtered based upon other columns from the list 3402 of FIG. 34 or other relational data columns from related lists.

Because the GUI 3500 is provided via a cloud instance, where each update uses a data modification request and subsequent response, it may be beneficial, in certain embodiments, to refresh the visualized data only upon selecting an option 3526 to apply the filters to the GUI 3500. This may reduce a number of data requests and/or responses used in the visualization of the GUI 3500.

Figure 36:
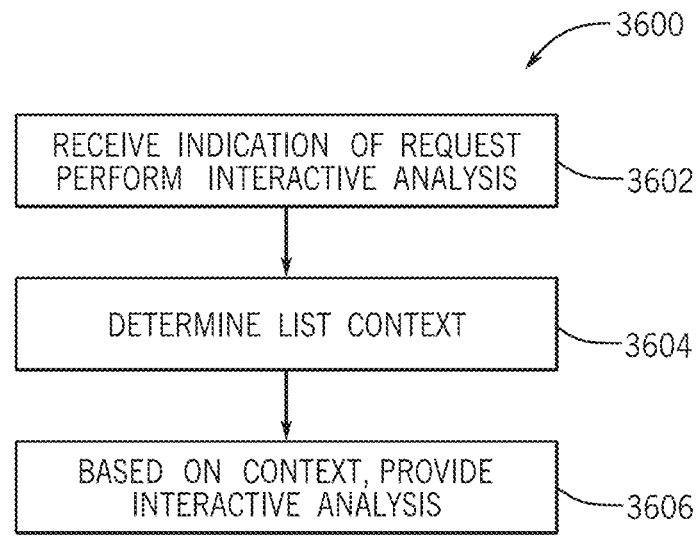
FIG. 36 is a flowchart, illustrating a process for providing interactive analysis, in accordance with an embodiment.
Figure 37:
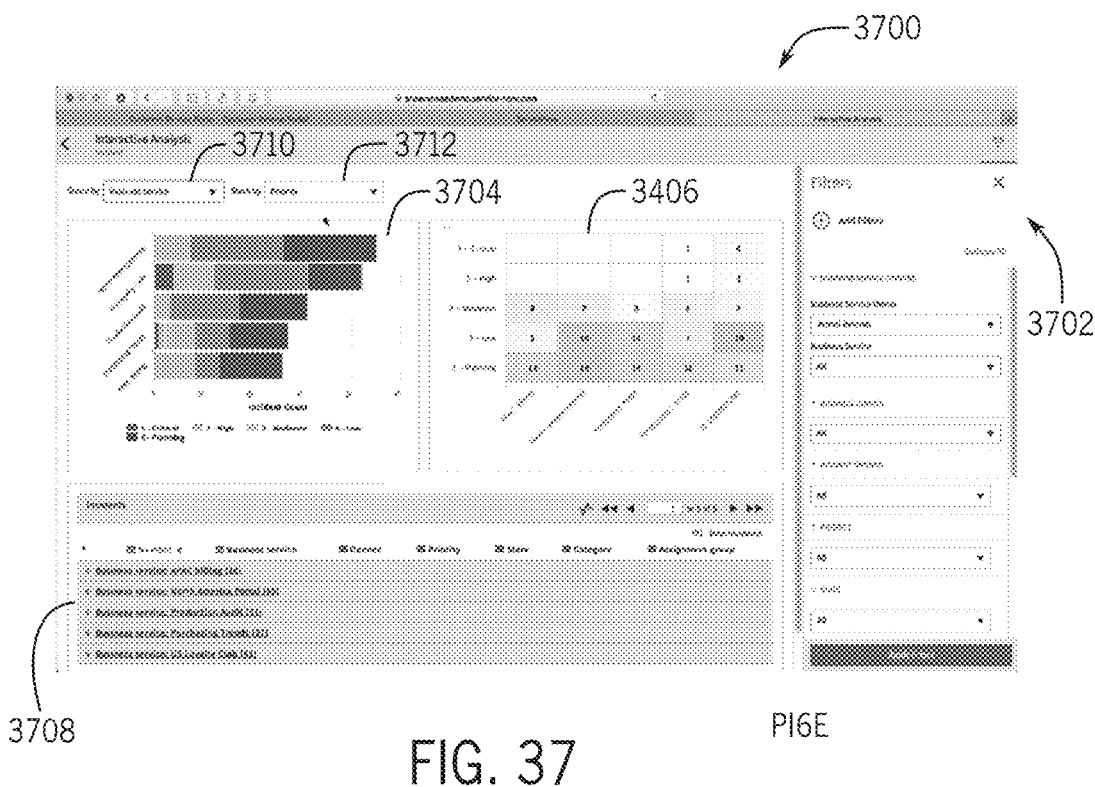
FIGS. 37-41 are an illustration of GUIs for providing filtering, in accordance with an embodiment.
Figure 38:
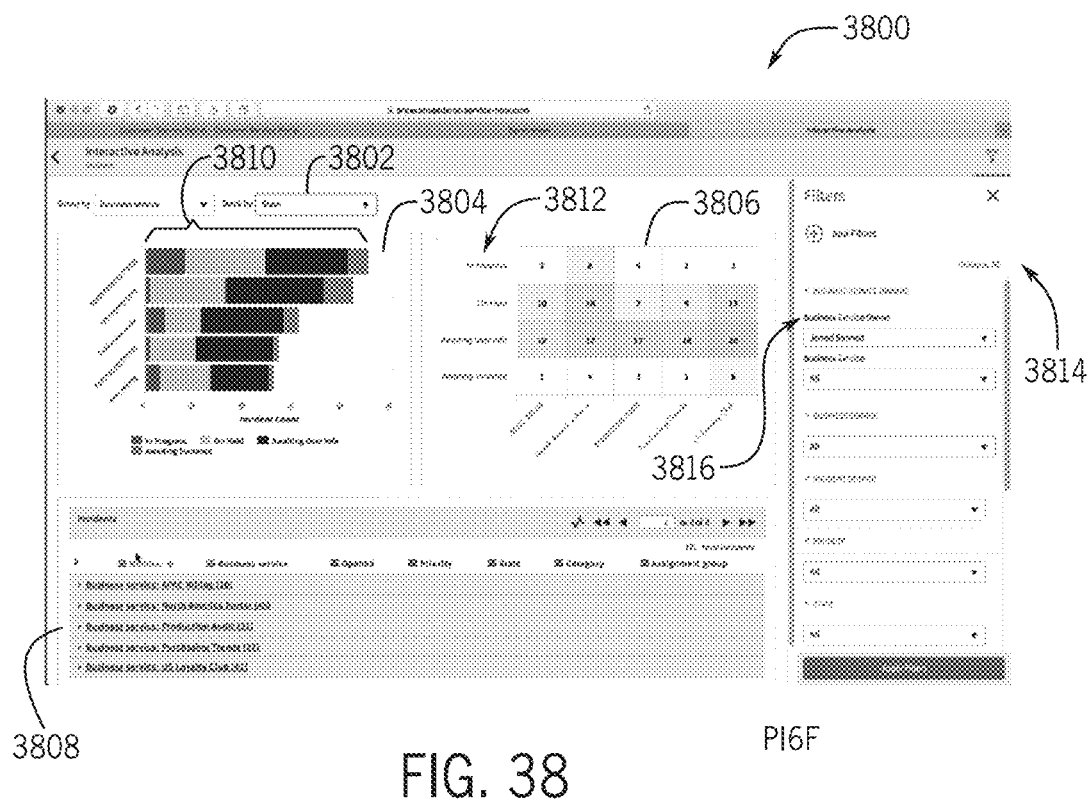

FIG. 36 is a flowchart, illustrating a process 3600 for providing the interactive analysis GUI 3500 of FIG. 35, in accordance with an embodiment. The process 3600 begins by receiving an indication of a request to perform interactive analysis (block 3602). For example, as discussed with regard to FIG. 34, the request may be received via selection of the option 3408 to launch interactive analysis.

A list context may be determined (block 3604). As mentioned above, the request may include a column indication, which may indicate a particular basis for the Interactive Analysis. For example, in FIG. 34, the option 3408 is selected from a sub-menu 3404 associated with the category column 3406. Accordingly, the primary context of the list may be defined as the category column 3408.

Based upon the primary context, the interactive analysis GUI (e.g., GUI 3500 of FIG. 35) may be presented. For example, returning to the depicted embodiment of FIG. 35, the bar chart widget 3502, the heat map 3504, and/or the collapsed list 3520 may be presented with a primary focus on the primary context (e.g., the category column 3408). Accordingly, useful information regarding the primary context may be provided very efficiently, providing easy-to-use details regarding the primary context.

Data Filtering

Turning now to a discussion of the filtering of the visualized data, FIGS. 37-41 are an illustration of GUIs for providing filtering, in accordance with certain embodiments. In the GUI 3700 of FIG. 37, the filter sidebar 3702 is presented to filter out certain data from the visualized data of the interactive analysis. Similar to the previously described embodiments, the current interactive analysis provided by GUI 3700 includes a bar chart widget 3704 and a heat map widget 3706. Additionally, a collapsible list 3708 is provided. As illustrated by the indicator 3710, the group by characteristic is "Business Service". Further, as illustrated by the indicator 3712, the stack by characteristic is "Priority".

The indicators 3710 and/or 3712 may be modified to change the presentation of the data visualized in the bar chart widget 3704, the heat map widget 3706, and/or the collapsible list 3708. For example, in GUI 3800 of FIG. 38, the indicator 3802 is changed from the previous value of priority in FIG. 37 to "State". Based upon this change, the visualization in the bar chart widget 3804, the heat map widget 3806, and/or the collapsible list 3808 changes. For example, the bar chart widget 2804 illustrates a bars with stacked states 3810, as indicated by the key 3812. Further, the heat map 3806 is modified, such that the states are presented in the Y-axis 3812. In certain embodiments, the collapsible list 3808 is not modified based upon modified stack by characteristics. However, in other embodiments, the sorting may be changed based upon this modified characteristic.

Additionally, filters may be added to the data, resulting in visualization of data that satisfies the filter criteria. For example, in the filter dialog box 3814, "Jerrod Bennet" is selected from the Business Service Owner filter selections 3816. Based upon this selection, the data visualized in the bar chart widget 3804, the heat map widget 3806, and/or the collapsible list 3808 is modified to only include data associated with "Jerrod Bennet" as the Business service owner.

Figure 39:
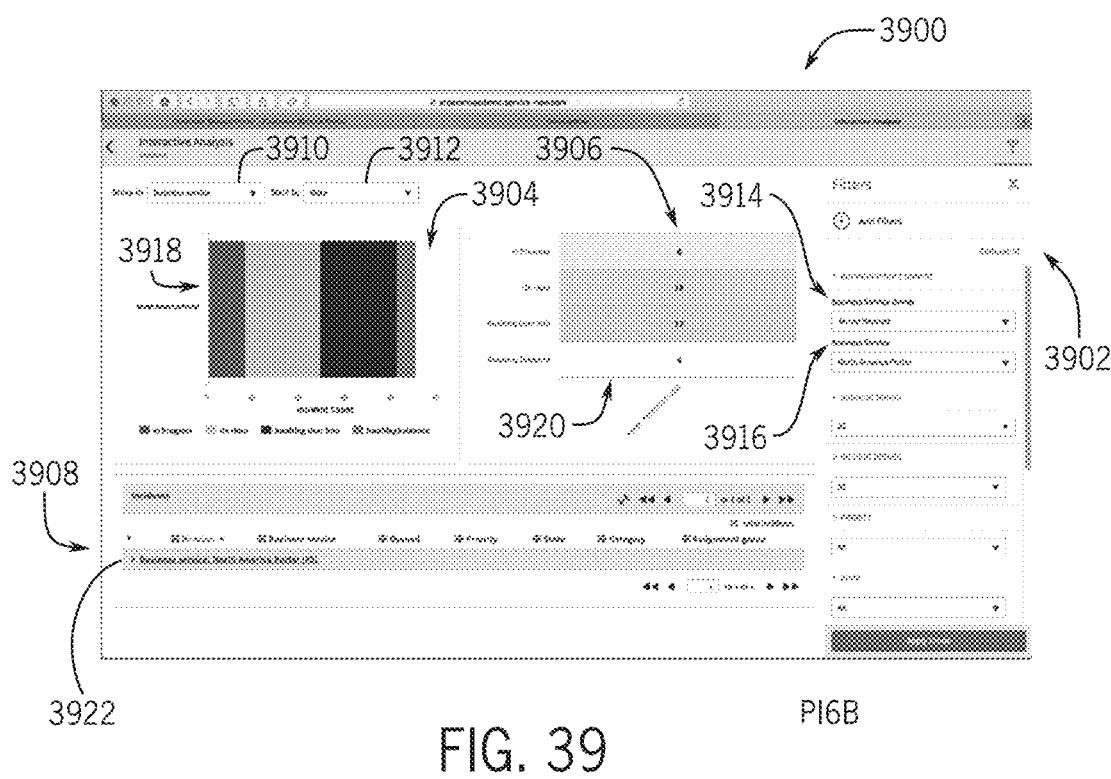

Further, cascading filters may be used to filter the data visualized in the bar chart widget 3804, the heat map widget 3806, and/or the collapsible list 3808. Cascading filters enable drilling down of filter features to filter the visualized data. For example, in FIG. 39, "Jarrod Bennet" is selected as a Business Service Owner filter 3914. Additional sub-filter selections may be provided based upon the selection of "Jarrod Bennet". For example, suppose Jarrod Bennet is associated with certain geographies (e.g., North America, Central America, etc.). A sub-filter selection may be presented upon selection of "Jarrod Bennet". In the embodiment illustrated in FIG. 39, the selection of "Jarrod Bennet" results in presentation of sub-filter options 3916 for particular business services that Jarrod Bennet is associated with. In FIG. 39, a "North America Portal" selection is selected from sub-filter options 3916, resulting in the visualized data of the bar chart widget 3904, the heat map widget 3906, and/or the collapsible list 3908 to only display data records associated with "Jarrod Bennet" and his related business service "North American Portal". Accordingly, only one bar 3918, representing business services, is provided in the bar chart widget 3904. Similarly, only one column 3920, representing the North American Portal, is provided in the heat map 3906 and only one collapsed section 3922 is provided in the collapsible list 3708.

Figure 40:
Figure 41:
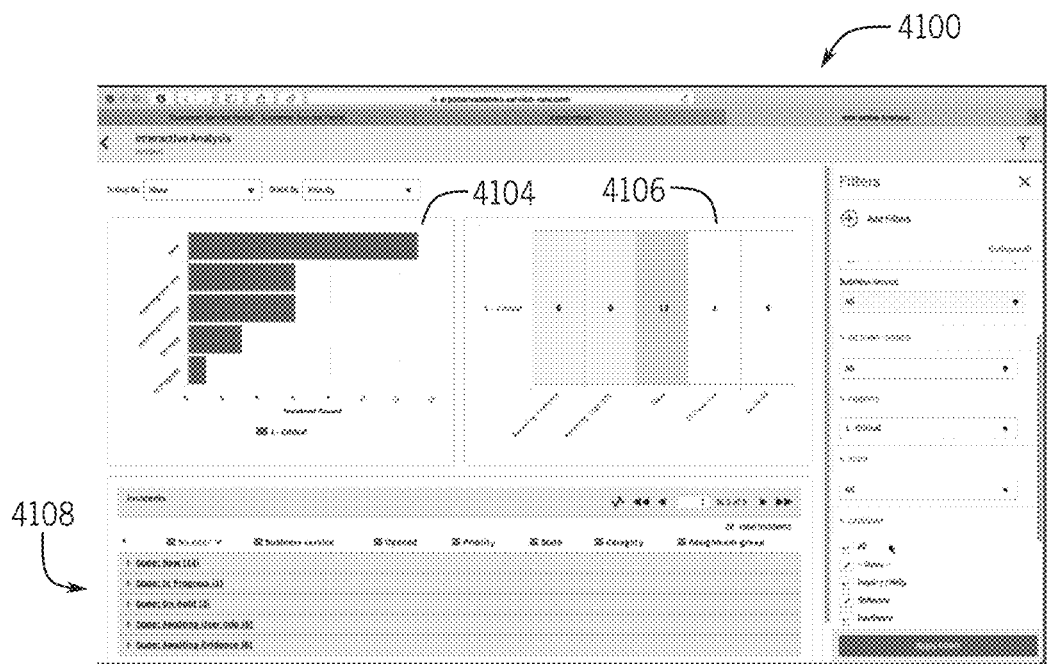

FIGS. 40 and 41 provide GUIs 4000 and 4100 illustrating application of a filter only after requesting application of the filter to the visualized interactive analysis, in accordance with an embodiment. In GUI 4000, a priority filter 4002 is set to "critical" for the bar chart widget 4004, the heat map widget 4006, and/or the collapsible list 4008. However, in the current embodiment, the filter is not applied until the "Apply Filters" option 4010 is selected from the filter sidebar 4012. Accordingly, as illustrated in FIG. 40, data records for each of the priorities is visualized in the bar chart widget 4004, the heat map widget 4006, and/or the collapsible list 4008.

As depicted in the GUI 4100 of FIG. 41, once the "Apply Filters" option 4010 is selected, the bar chart widget 4104, the heat map widget 4106, and/or the collapsible list 4108 are all updated, reflecting only the data that satisfies the filter criteria (e.g., the critical priority). For example, there is only one stack in the bar chart widget 4104 (the stack representing records with a critical priority). Further, only one row is present in the heat map 4106 (the row representing records with a critical priority). Further, the collapsible list 4108 only includes records with a critical priority.

Figure 42:
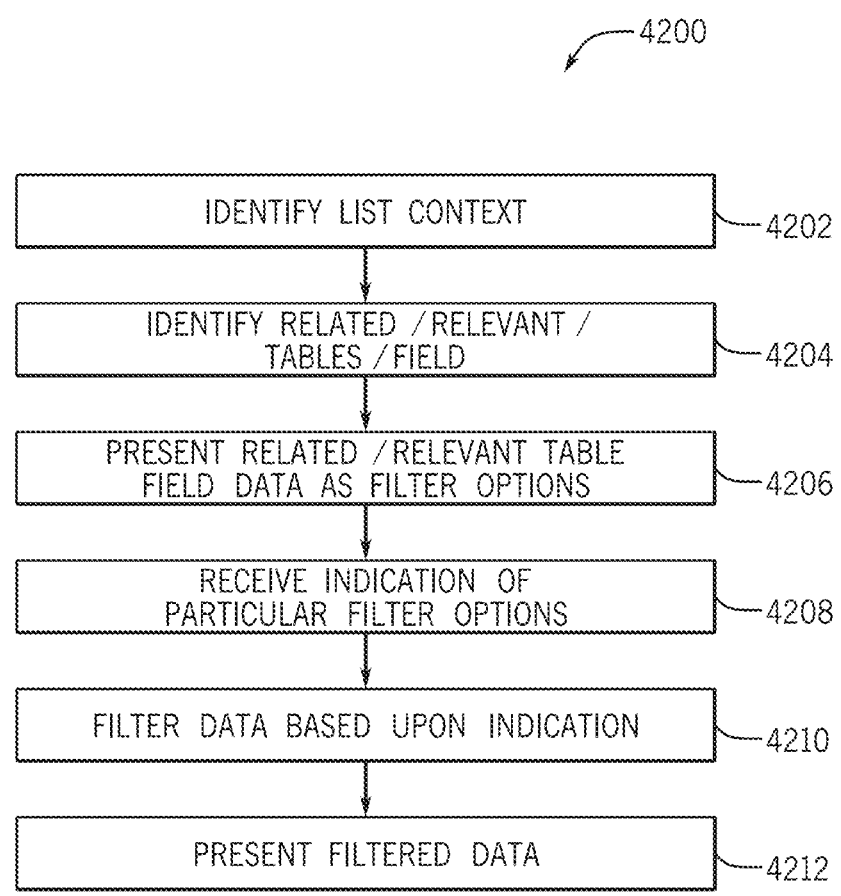
FIG. 42 is a flowchart, illustrating a process for relational filtering, in accordance with an embodiment.

FIG. 42 is a flowchart, illustrating a process 4200 for relational filtering, in accordance with an embodiment. First, a list context is identified (block 4202). For example, a relational table or tables associated with the list data is identified. For example, a list of incident records may be stored in an incident table that includes the incident number (primary key), an associated business service for the incident, an incident opening date/time, a priority, a state, a category, and an assigned group for the incident.

Related and/or relevant tables and fields may also be identified based upon the context of the list. The related and/or relevant tables and fields may be determined based upon a degree of relationship between the tables. In some embodiments, tables that are relationally connected based upon a threshold number of connections may be considered related and/or relevant tables and fields. For example, when the threshold is set to 1, a first table and/or first field that is directly related to incident table may be identified as related and/or relevant tables and fields. However, a second table and/or second field related the first table and/or first field, but not directly related to the incident table will not be identified as a related and/or relevant table and/or field, because the relationship includes 2 degrees of separation, exceeding the threshold of 1 degree of separation. To incorporate the second table and/or second field, the threshold could be increased to 2.

The related and/or relevant tables and/or fields may be presented as filter options. For example, the Business Service Owner filter options 3816 of FIG. 38 may be presented based upon these options being identified as related and/or relevant tables and/or fields.

Upon receiving an indication of a particular filter option from those presented in block 4206 (block 4208), the data may be filtered based upon the indication (block 4210) and presented (block 4212). For example, returning to FIG. 38, only records where "Jerrod Bennett" is the Business Service Owner will be presented. All other records (e.g., where "Jerrod Bennet" is not the attributed Business Service Owner are not presented. As may be appreciated, by increasing the filtering capabilities to include subsets of related tables, filtering becomes much more powerful.

External Data Sources/Reporting

Figure 43:
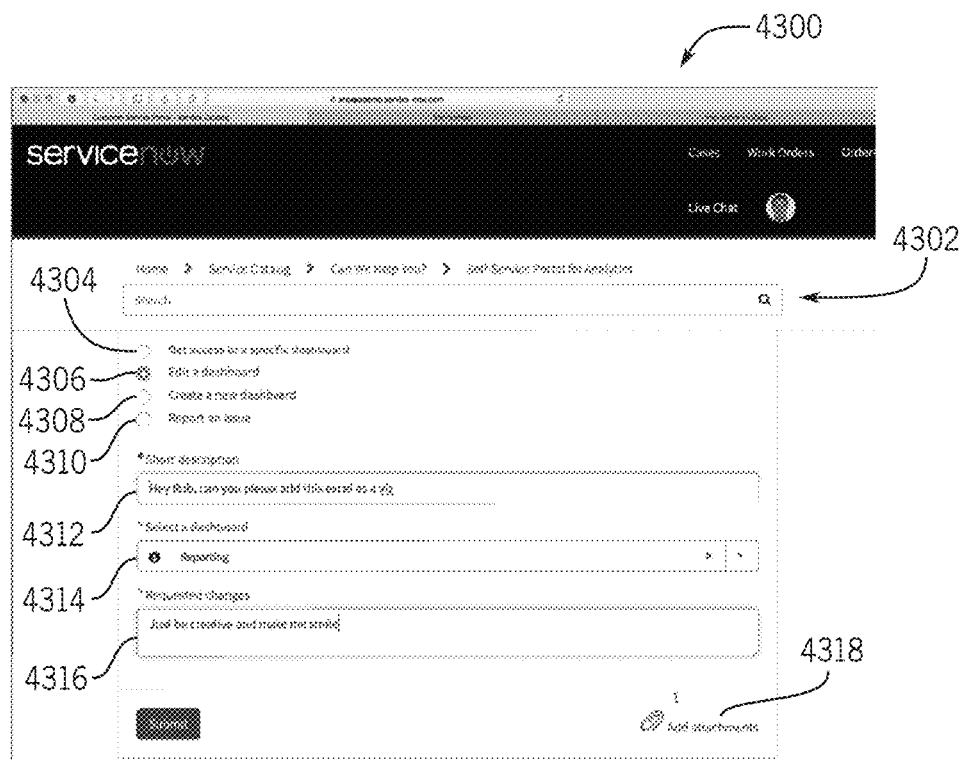
FIG. 43 is an illustration of a GUI triggering import from an external data source via a portal request, in accordance with an embodiment.

Turning now to a discussion of reporting, FIG. 43 is an illustration of a GUI 4300 where import from an external data source is triggered via a portal request, in accordance with an embodiment. In the GUI 4300, a Portal Request Generation dialog box 4302 for submitting a portal request is provided. The Portal Request Generation dialog box 4302 includes an option 4304 for requesting access to a specific dashboard, an option 4306 to request an edit to a dashboard, an option 4308 requesting a new dashboard be created, and an option 4310 to report an issue. A short description field 4312 is provided as well, enabling a brief explanation of the request. A relevant dashboard regarding the request may be selected via the option 4314. Further, a description of the requested changes may be provided via the text box 4316.

In FIG. 43, a user is requesting that a dashboard be edited to include external data (e.g., an Excel spreadsheet) as a visualization. The external data may be provided using the option 4318 to add an attachment. Upon selection of the option 4318, the external data source import process may be triggered, as will be discussed in more detail below.

Figure 44:
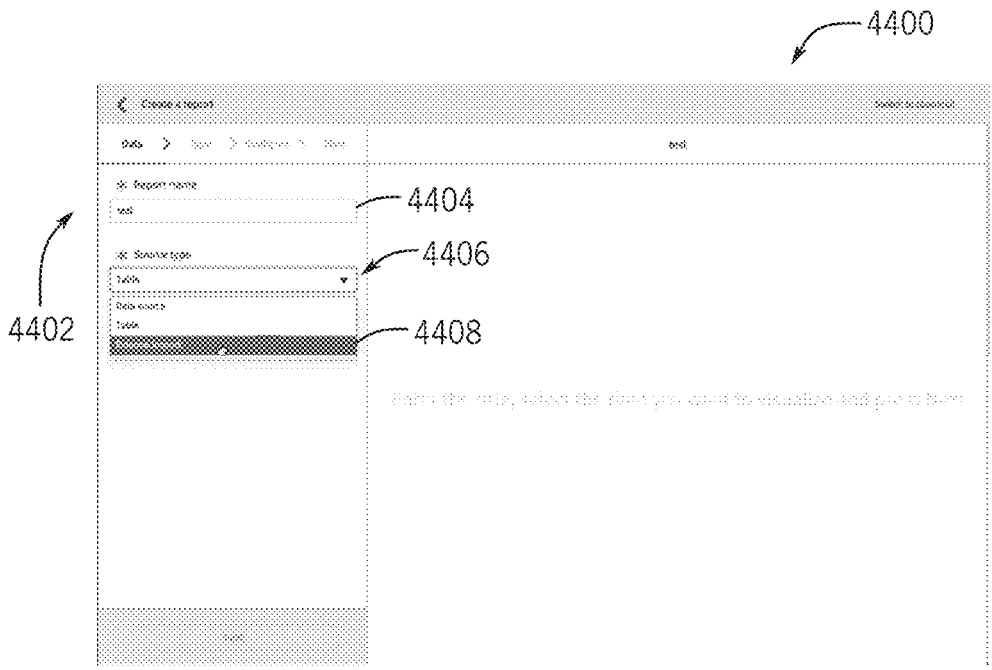
FIG. 44 is an illustration of a GUI triggering import from an external data source via a report designer, in accordance with an embodiment.

Additionally and/or alternatively, the external data import process may be triggered from a report generation process. FIG. 44 provides an illustration of a GUI 4400 where import from an external data source is triggered by a report generation process, in accordance with an embodiment. The GUI 4400 includes a report generation sidebar 4402 which includes a prompt 4404 for a report name. Further, a source type selector 4406 may provide options for various sources for the report, including an external import option 4408. The external import option 4408, when selected, may also trigger the external data import process.

Figure 45:
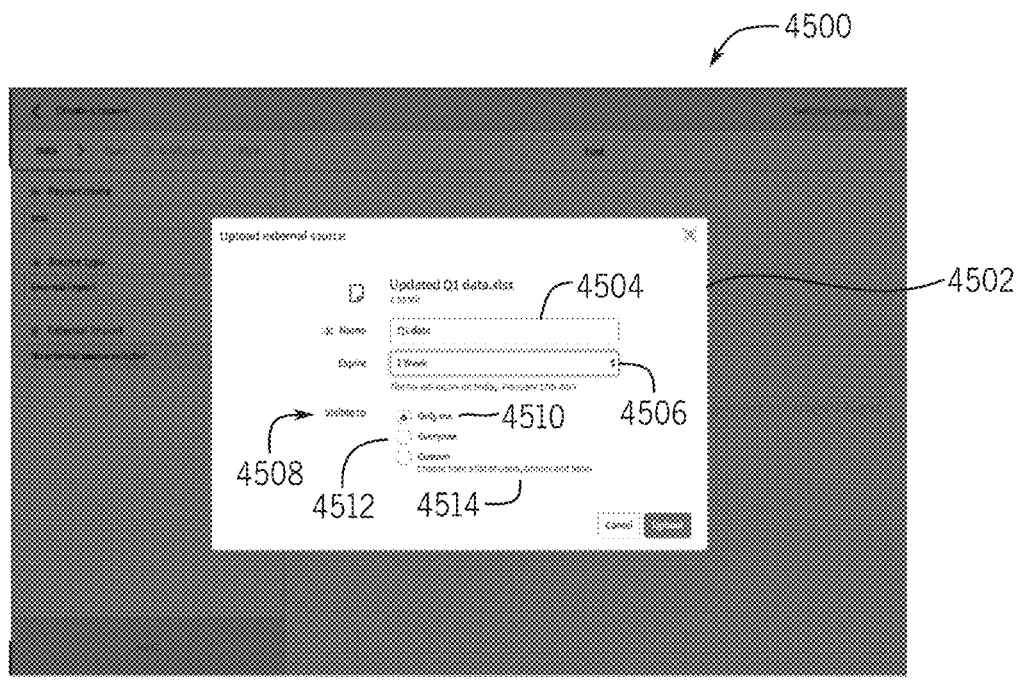
FIG. 45 is an illustration of a GUI prompting for import characteristics for the import of an external data source, in accordance with an embodiment.

The external data import process may be facilitated by prompting for particular characteristics of the import. FIG. 45 is an illustration of a GUI 4500 prompting for import characteristics for the import of an external data source, in accordance with an embodiment. The dialog box 4502 provides a Name field 4504 prompting for a name that will represent the data, once imported. In some embodiments, an Expiration option 4506 prompts for a date when the imported data will expire. Further, a visible to option 4508 allows the imported data to only be visible to the importer (option 4510), to everyone (option 4512), or to a custom group (option 4514). Based upon the selections in FIG. 45, a data set "Q1 data" will be available only to the importer for 1 week from the date of import. At that point it the data set will expire and no longer be accessible.

Figure 46:
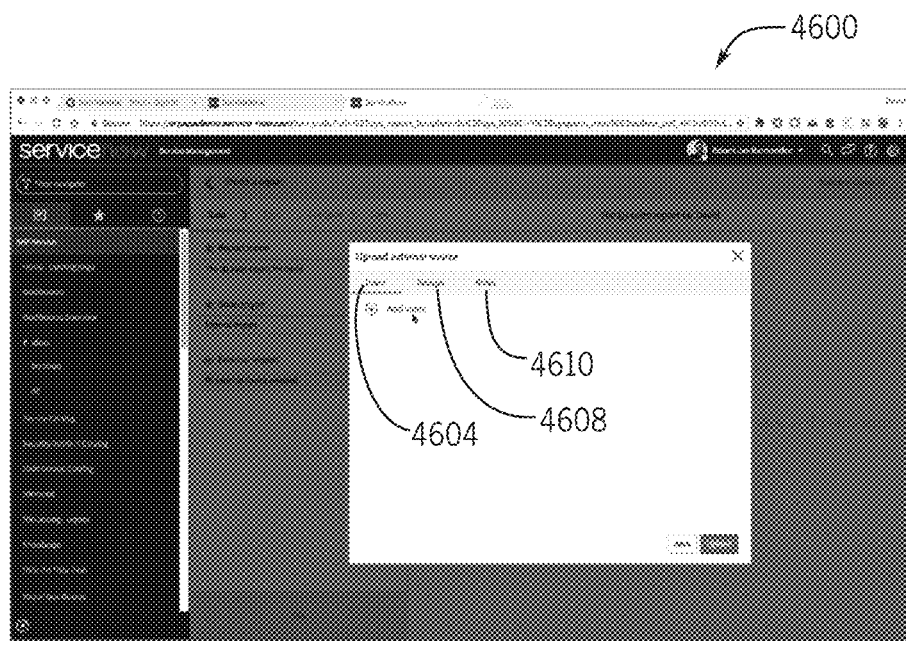
FIG. 46 is an illustration of a GUI prompting for custom visibility characteristics for the import of an external data source, in accordance with an embodiment.

FIG. 46 is an illustration of a GUI 4600 providing a dialog box 4602 prompting for custom visibility characteristics for the import of an external data source, in accordance with an embodiment. As illustrated, the dialog box 4602 allows users (option 4604), groups (option 4606), and/or roles (option 4608) to be added to the visibility of the external data, once imported.

Figure 47:
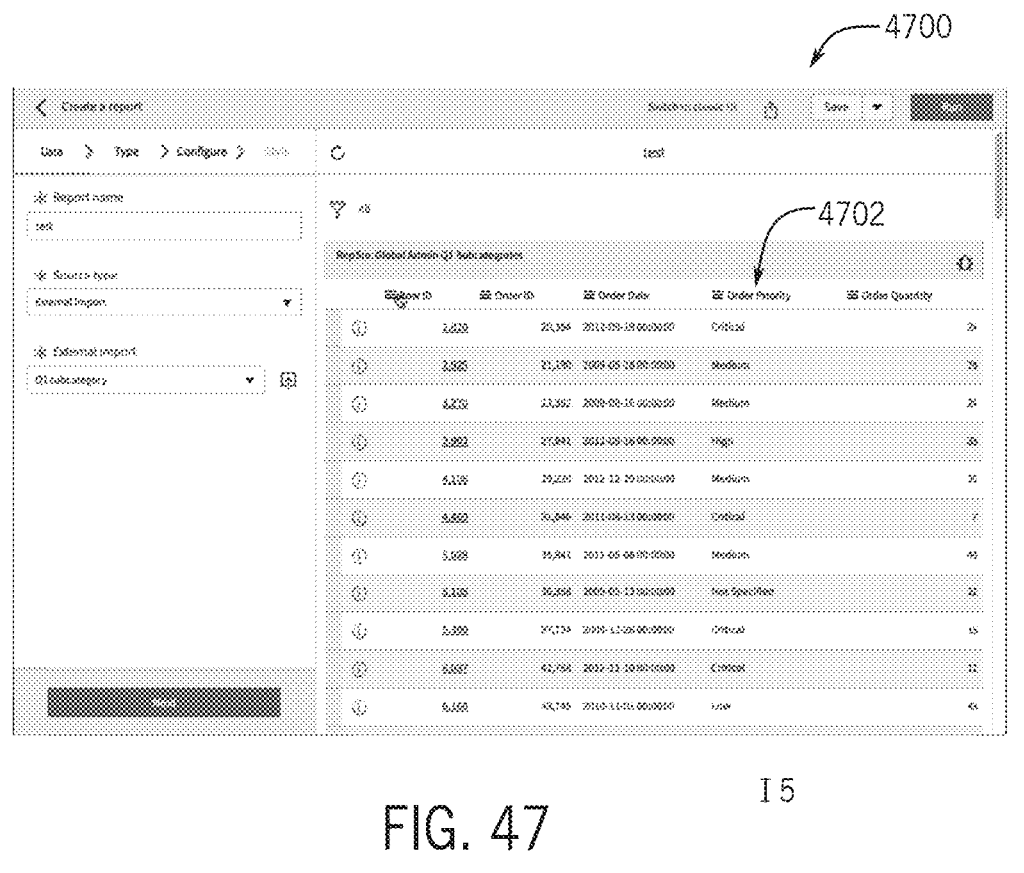

Once the characteristics are entered, the external source data may be imported. FIG. 47 is an illustration of a GUI 4700 that provides data imported from an external source via the report designer and/or the portal request, in accordance with an embodiment. As illustrated, the GUI 4700 provides a graphical list 4702 of the imported data, further providing portal-based control of the data for portal-related tasks, such as reporting.

Figure 48:
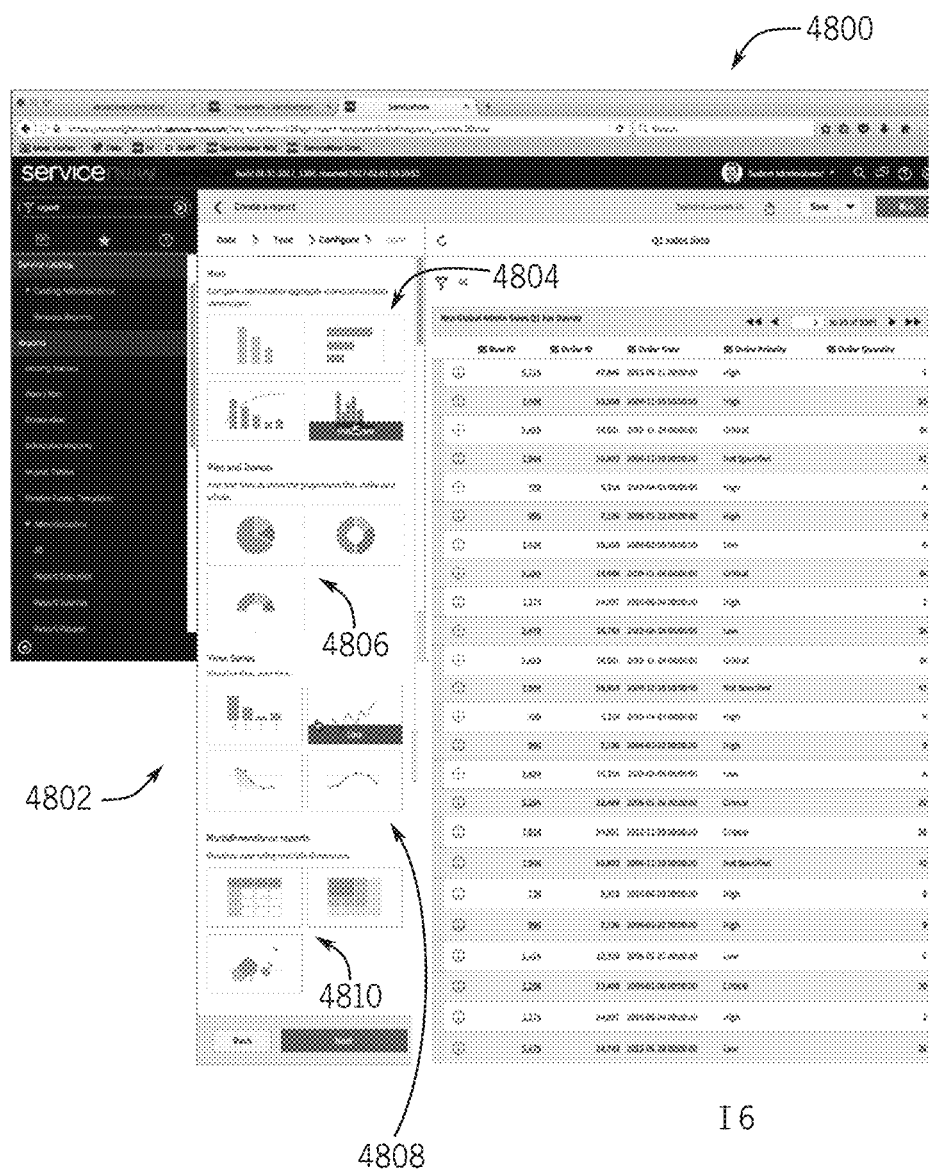
FIG. 48 is an illustration of a GUI for facilitating report styles for data imported from an external source via the report designer, in accordance with an embodiment.

For example, once the external source data is imported and selected for reporting (or other internal data is selected for reporting), the report designer may create a customized report for the data. FIG. 48 is an illustration of a GUI 4800 for facilitating report styles for data imported from an external source (or from internally sourced data), in accordance with an embodiment. The GUI 4800 may provide a report styles dialog box (e.g., a sidebar) 4802, enabling selection of a style from a set of report styles. For example, various bar selections 4804, pies and donuts selections 4806, time-series data selections 4808, and multi-dimensional report selections 4810 are provided.

Figure 49:
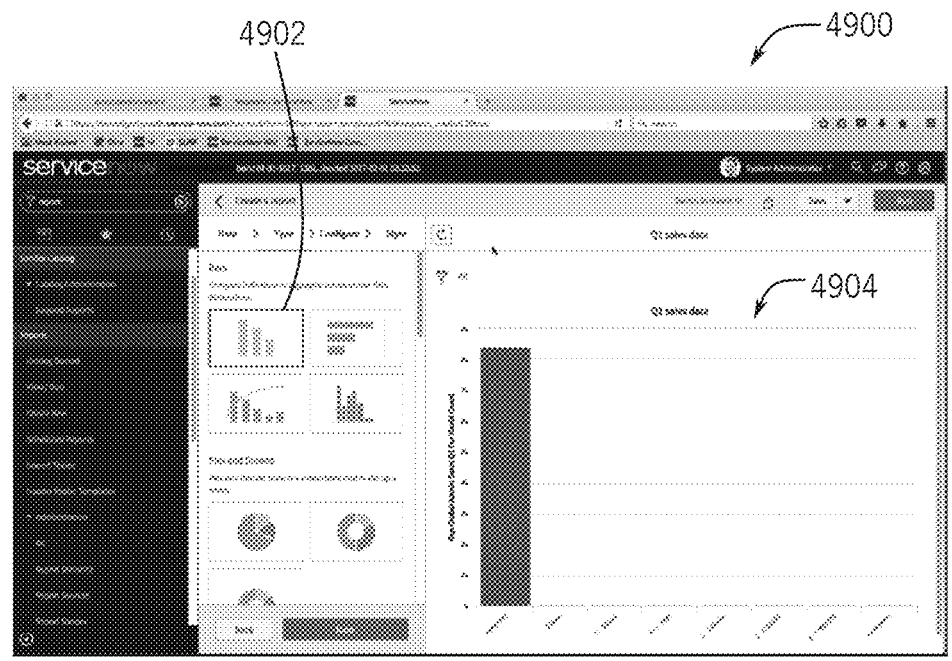
FIG. 49 is an illustration of a GUI for facilitating generation of a bar graph for data imported from an external source via the report designer, in accordance with an embodiment.

Upon selection of one of the style selections, the report may be generated based upon the selected style. For example, in FIG. 49, a vertical bar chart system 4902 is selected in the GUI 4900. A vertical bar report 4904 is generated based upon this selection.

Figure 50:
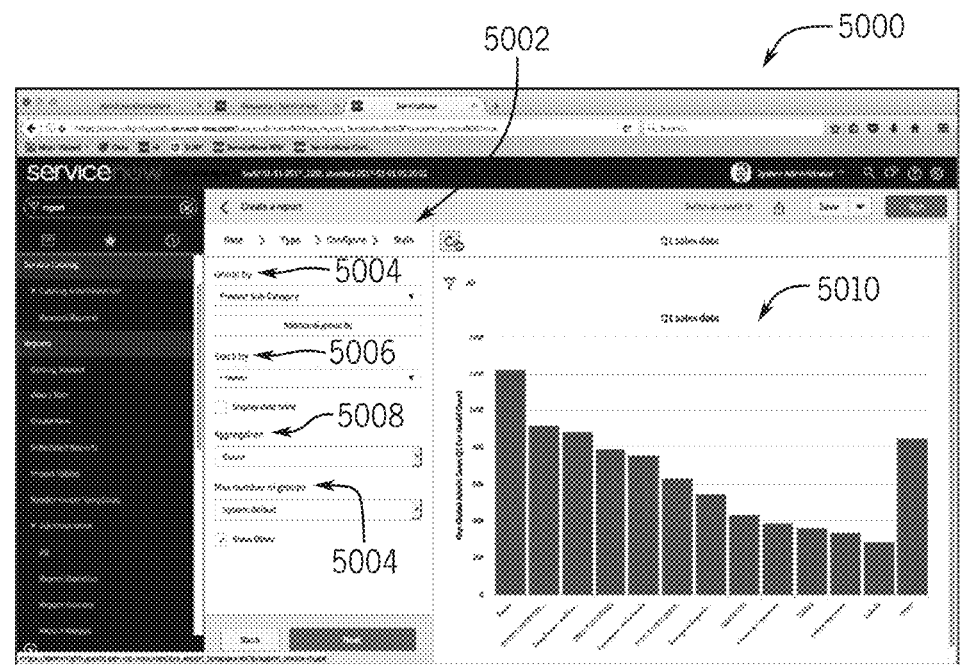
FIG. 50 is an illustration of a GUI for facilitating modification of grouping, stacking, and aggregation characteristics of the bar graph, in accordance with an embodiment.

The report designer may also offer a dialog box for selecting additional characteristics for the report. For example, FIG. 50 is an illustration of a GUI 5000 that provides a dialog box 5002 for facilitating modification of grouping characteristics (option 5004), stacking characteristics (option 5006), aggregation characteristics (option 5008) of the bar graph report 5010, in accordance with an embodiment. Based upon the selections of FIG. 50, the bar graph report 5010 is grouped by product sub-category with a system default (e.g., unrestricted) number of groups. Further, there is no stacking and the aggregation is based upon a count.

Figure 51:
FIG. 51 is an illustration of a GUI for facilitating modification of general appearance characteristics of the bar graph, in accordance with an embodiment.

FIG. 51 is an illustration of a GUI 5100 providing a dialog box 5102 that facilitates modification of general appearance characteristics of the report (e.g., the bar graph), in accordance with an embodiment. The dialog box 5102 includes a general tab 5104, which includes a chart color option 5106 and a set palette option 5108. The chart color option 5106 allows selection of color variation selections, such as usage of a full color palette and/or use of one color. The actual palette used (e.g., a dark blue pallet) is selected from option 5108. A display data labels option 5110 may selectively enable data labels. Further the custom chart size option 5112, when selected, enables manual entry of a chart size. Alternatively, the chart size may set to pre-defined sizes (e.g. small, medium, large, etc.) via option 5114. Further, a drilldown view may be selected via option 5116. The selected drilldown view may be presented when the data in the chart is selected. Option 5118 enables selection of a particular decimal point precision for the data.

Figure 52:
FIG. 52 is an illustration of a GUI for facilitating modification of title characteristics of the bar graph, in accordance with an embodiment.

The dialog box 5102 also includes a Title tab 5120. FIG. 52 is an illustration of a GUI 5200 presenting the title tab 5120. The Title tab 5120 facilitates modification of title characteristics of the bar graph, in accordance with an embodiment. For example, option 5202 selectively turns presentation of the title on or off. For example, in FIG. 52, the title will be selectively turned off, because the option 5202 is set to "Report only". Option 5204 is a text box enabling input of the title. The font size of the chart title may be set using option 5208. A custom chart title position may be set when option 5210 is selected. A horizontal alignment (e.g. left, center, or right justified) for the title may be selected via option 5212. A vertical alignment (top, bottom, or center justified) may be set via option 5214.

Figure 53:
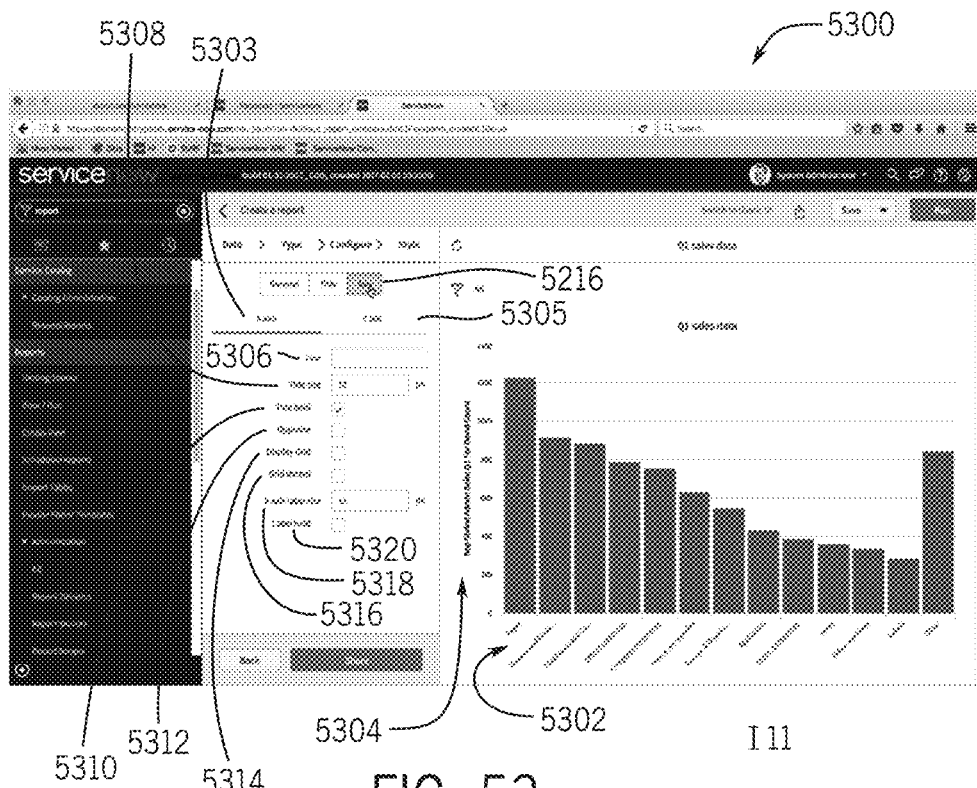
FIG. 53 is an illustration of a GUI for facilitating modification of axis characteristics of the bar graph, in accordance with an embodiment.

An Axis tab 5216 may also be presented upon selection. FIG. 53 is an illustration of a GUI 5300 that presents the axis tab 5216, facilitating modification of axis characteristics of the bar graph, in accordance with an embodiment. For example, options for the X-axis 5302 may be altered via an X-axis tab 5303. Options for the Y-axis 5304 may be altered via a Y-axis tab 5305. Options for both the X-axis tab 5303 and the Y-axis tab 5305 may include a Title option 5306 where a title for the respective access may be set. The option 5308 may set the font size for the title for the respective axis. Option 5310 may selectively bold the axis titles. Option 5312 selectively sets an opposite. Option 5314 selectively displays a grid for the respective access. Option 5316 selectively sets the grid to a dotted grid for the respective axis. Option 5318 sets a label size of the respective axis. Option 5320 selectively sets the label to bold.

Figure 54:
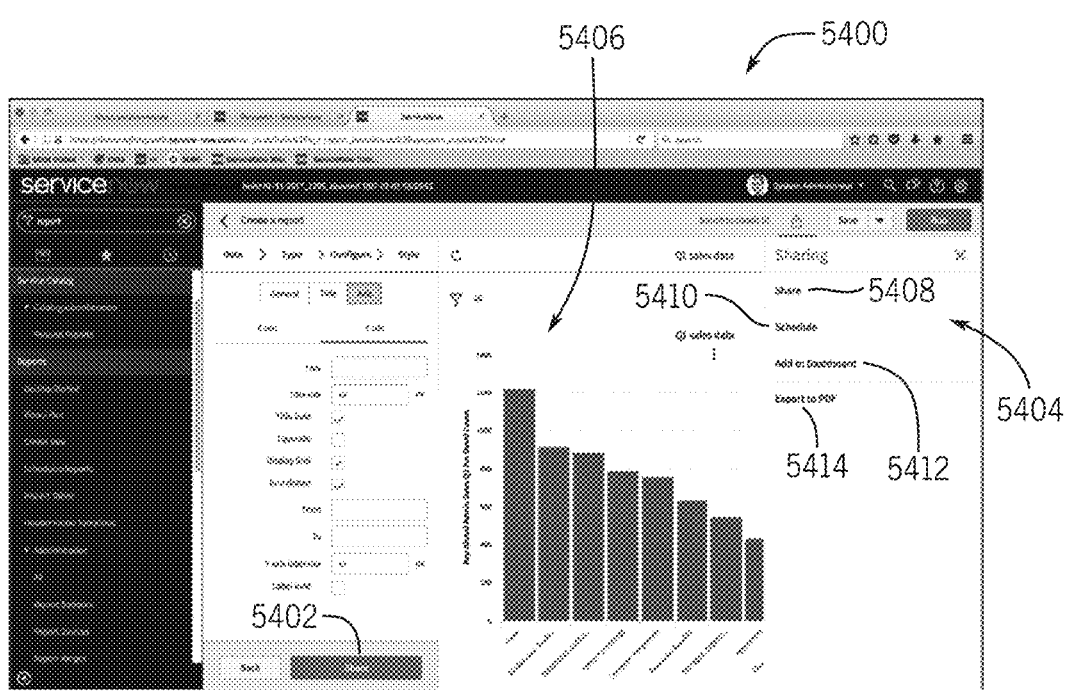
FIG. 54 is an illustration of a GUI for facilitating report sharing, in accordance with an embodiment.
Figure 55:
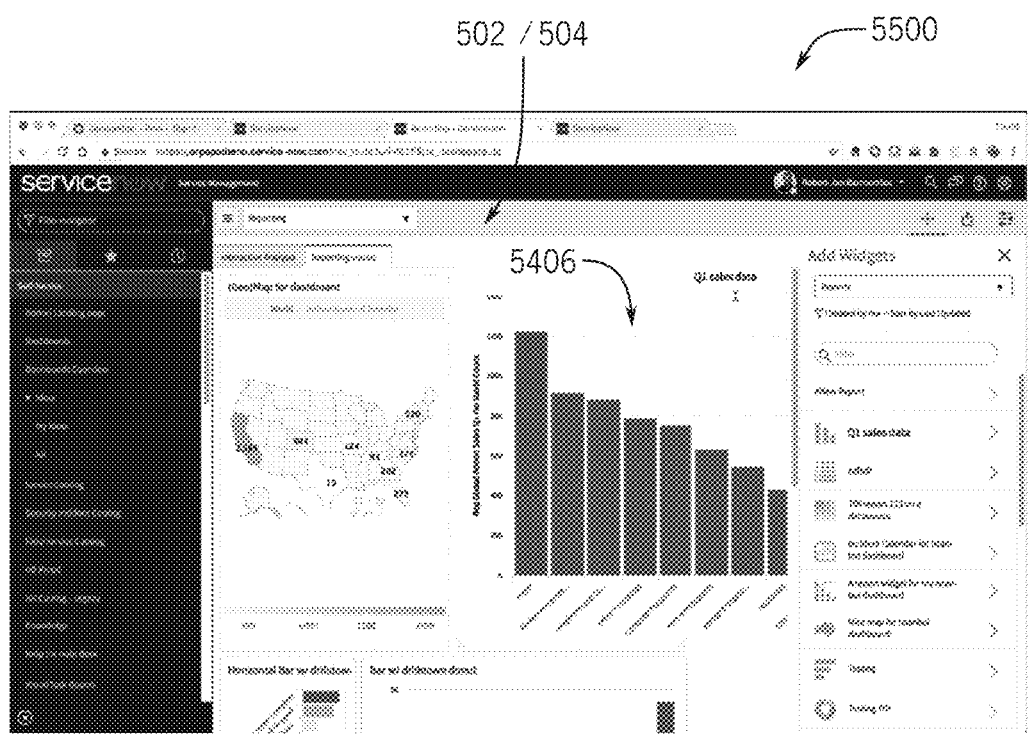
FIG. 55 is an illustration of a GUI for facilitating embedding the report in a homepage/dashboard, in accordance with an embodiment.

In some embodiments, once a report is created, the report may be shared. FIG. 54 is an illustration of a GUI 5400 including an option 5402 for facilitating report sharing, in accordance with an embodiment. When the option 5402 is selected, a sharing dialog box 5404 is presented. The sharing dialog box 5404 enables the report 5406 to be shared to users, roles, or groups (option 5408), scheduled for sharing at a later date/time (option 5410), added to a dashboard (option 5412), or exported (e.g., to a portable document file) (option 5414). FIG. 55 is an illustration of a GUI 5500 presenting the report 5406 embedded in a homepage 502 and/or dashboard 504, in accordance with an embodiment.

Using the above-described techniques, complex analytics, forecasting, interaction, and/or reporting may be simplified and/or enhanced. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(1).

What is claimed is:
1. An interactive analysis system, comprising:
a non-transitory memory; and one or more hardware processors configured to read instructions from the non-transitory memory to perform operations comprising:

identifying a plurality of incidents, wherein each of the plurality of incidents comprises a plurality of columns;

performing an interactive analysis based at least on the plurality of incidents;

generating widget data based upon the interactive analysis;

generating a widget configured to present the widget data; and generating a dashboard configured to present the widget with other widgets in a manner not subject to fixed widget locations and fixed widget sizes, by converting a homepage specifying presentation of the widget and the other widgets subject to the fixed widget locations and the fixed widget sizes to the dashboard, by:

identifying the widget and the other widgets in the homepage;

identifying corresponding fixed locations and fixed sizes in the homepage of the widget and the other widgets, by traversing a computer-readable representation of the homepage; and inserting the identified widgets into the dashboard at the identified fixed locations and with fixed sizes.

2. The interactive analysis system of claim 1, wherein the operations comprise:

generating a filter, the filter configured to reduce the plurality of incidents to a subset of the plurality of incidents that satisfy one or more criteria of the filter.

3. The interactive analysis system of claim 2, wherein the filter comprises a cascading filter comprising a first level of selectable options for the one or more criteria and a second level of selectable options for the one or more criteria, wherein the second level of selectable options is defined by a selected option of the first level of selectable options.

4. The interactive analysis system of claim 2, wherein filter criteria selections are derived based upon a degree of relations between a table storing the plurality of incidents and other tables storing potential filter criteria.

5. The interactive analysis system of claim 1, wherein the operations comprise:

receiving a forecast request, via a graphical-user-interface (GUI);

upon receiving the forecast request, analyzing the plurality of incidents to calculate a forecast for a subsequent plurality of incidents; and presenting, via the GUI, the forecast using a forecast indicator.

6. The interactive analysis system of claim 5, wherein the forecast is calculated by classifying the plurality of incidents and determining the subsequent plurality of incidents based at least in part on the classification.

7. The interactive analysis system of claim 6, wherein the forecast indicator comprises a dashed line, dotted line, or both that indicates traces of the subsequent plurality of incidents.

8. The interactive analysis system of claim 5, wherein the operations comprise:

receiving a target value;

presenting a target indication in a GUI;

analyzing the subsequent plurality of incidents to generate a prediction of when the target value will match the target value; and presenting a prediction notification identifying the prediction.

9. The interactive analysis system of claim 1, wherein the operations comprise:

presenting the widget, first, on the homepage constrained with the fixed widget locations and the fixed widget sizes, as defined by widget containers of the homepage; and presenting the widget, second, on the dashboard.

10. The interactive analysis system of claim 9, wherein the operations comprise:

sharing the widget with a recipient, by:

receiving an indication to share the dashboard with the recipient;

in response to receiving the indication to share the dashboard, providing an electronic notification to the recipient, the notification comprising an invitation to accept access to the dashboard;

receiving, in response to the electronic notification, an acceptance of the invitation; and in response to receiving the acceptance, enabling presentation of the dashboard by the recipient.

11. The interactive analysis system of claim 10, wherein the operations comprise:

receiving an indication of a specified role, group, or combination thereof as the recipient; and sharing the dashboard to the specified role, group, combination thereof.

12. The interactive analysis system of claim 1, wherein the operations comprise:

receiving a notification criteria;

presenting a notification indication in a GUI, the notification indication indicating when a notification will be presented;

analyzing the plurality of incidents to determine if the notification criteria is satisfied; and presenting a notification that the notification criteria is satisfied when the notification criteria is satisfied.

13. The interactive analysis system of claim 12, wherein the notification criteria comprises an all time high criteria, an all time low criteria, a less than value criteria, a more than value criteria, or any combination thereof.

14. A tangible, non-transitory, machine-readable medium, comprising machine-readable instructions, that, when executed by one or more processors of a machine, cause the machine to:

identify a plurality of incidents, wherein each of the plurality of incidents comprises a plurality of columns;

perform an interactive analysis based at least on the plurality of incidents;

generate-widget data based upon the interactive analysis;

generate a widget configured to present the widget data; and generate a dashboard configured to present the widget with other widgets in a manner not subject to fixed widget locations and fixed widget sizes, by converting a homepage specifying presentation of the widget and the other widgets subject to the fixed widget locations and the fixed widget sizes to the dashboard, by:

identifying the widget and the other widgets in the homepage;

identifying corresponding fixed locations and fixed sizes in the homepage of the widget and the other widgets, by traversing a computer-readable representation of the homepage; and inserting the identified widgets into the dashboard at the identified fixed locations and with the fixed sizes.

15. The machine-readable medium of claim 14, wherein a first one of the plurality of columns comprises an incident state and wherein a second of one the plurality of columns comprises an incident priority.

16. The machine-readable medium of claim 14, comprising instructions, that when executed by the one or more processors, cause the machine to:
filter the plurality of incidents based upon one or more selected criteria.

17. The machine-readable medium of claim 16, comprising instructions, that when executed by the one or more processors, cause the machine to generate options for the one or more selected criteria by:
identifying a set of tables, columns, or both having a relationship within a predetermined degree with an incident table storing the plurality of incidents; and
defining the options based upon the set of tables, columns, or both.

18. A method, comprising:
identifying a plurality of incidents, wherein each of the plurality of incidents comprises a plurality of columns;
performing an interactive analysis based at least on the plurality of incidents;
generating widget data based upon the interactive analysis;
generating a widget configured to present the widget data; and
generating a dashboard configured to present the widget with other widgets in a manner not subject to fixed widget locations and fixed widget sizes, by converting a homepage specifying presentation of the widget and the other widgets subject to the fixed widget locations and the fixed widget sizes to the dashboard, by:
identifying the widget and the other widgets in the homepage;
identifying corresponding fixed locations and fixed sizes in the homepage of the widget and the other widgets, by traversing a computer-readable representation of the homepage; and
inserting the identified widgets into the dashboard at the identified fixed locations and with the fixed sizes.

19. The method of claim 18, comprising:
presenting the widget, first, on the homepage constrained with the fixed widget locations and the fixed widget sizes, as defined by widget containers of the homepage; and
presenting the widget, second, on the dashboard.

20. The method of claim 18, comprising:
triggering the interactive analysis via a selection from a sub-menu corresponding to a column of the plurality of incidents.

* * * * *